US012732114B2

(12) United States Patent
Adragna

(10) Patent No.: US 12,732,114 B2
(45) Date of Patent: Sep. 8, 2026

(54) AUTOMATIC REVERSE CURRENT ADJUSTMENT IN AN ACTIVE CLAMP FLYBACK CONVERTER

(71) Applicant: STMicroelectronics International N.V., Geneva (CH)

(72) Inventor: Claudio Adragna, Monza (IT)

(73) Assignee: STMicroelectronics International N.V., Geneva (CH)

(*) Notice: Subject to any disclaimer, the term of this patent is extended or adjusted under 35 U.S.C. 154(b) by 330 days.

(21) Appl. No.: 18/500,343

(22) Filed: Nov. 2, 2023

(65) Prior Publication Data

US 2025/0149991 A1 May 8, 2025

(51) Int. Cl.
*H02M 3/335* (2006.01)
*H02M 1/00* (2006.01)
*H02M 1/38* (2007.01)

(52) U.S. Cl.
CPC ..... *H02M 3/33569* (2013.01); *H02M 1/0009* (2021.05); *H02M 1/0058* (2021.05); *H02M 1/385* (2021.05)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

| | | | | |
|---|---|---|---|---|
| 2008/0278984 | A1 | 11/2008 | Stanley | |
| 2017/0264206 | A1* | 9/2017 | Rana ................. | H02M 3/33569 |
| 2019/0013739 | A1 | 1/2019 | Hari et al. | |
| 2020/0021199 | A1 | 1/2020 | Phadke | |
| 2020/0313539 | A1 | 10/2020 | Hall et al. | |
| 2021/0408918 | A1 | 12/2021 | Sigamani et al. | |

* cited by examiner

*Primary Examiner* — Bryan R Perez
(74) *Attorney, Agent, or Firm* — Slater Matsil, LLP

(57) ABSTRACT

According to an embodiment, a method is proposed that includes sensing a reverse current through a main switch of an active clamp flyback (ACF) converter. The ACF converter includes a flyback transformer and an auxiliary switch. The method further includes determining whether a sense voltage corresponding to the reverse current exceeds a threshold; decreasing a duration for the reverse current by an incremental time interval, the duration of the reverse current including a first incremental time interval, the duration of the reverse current corresponding to a duration that the auxiliary switch is activated; increasing the duration by a second incremental time interval greater than the first incremental time interval, the increasing being in response to the reverse current not exceeding the threshold; and activating the auxiliary switch for the duration to achieve zero voltage switching (ZVS).

20 Claims, 10 Drawing Sheets

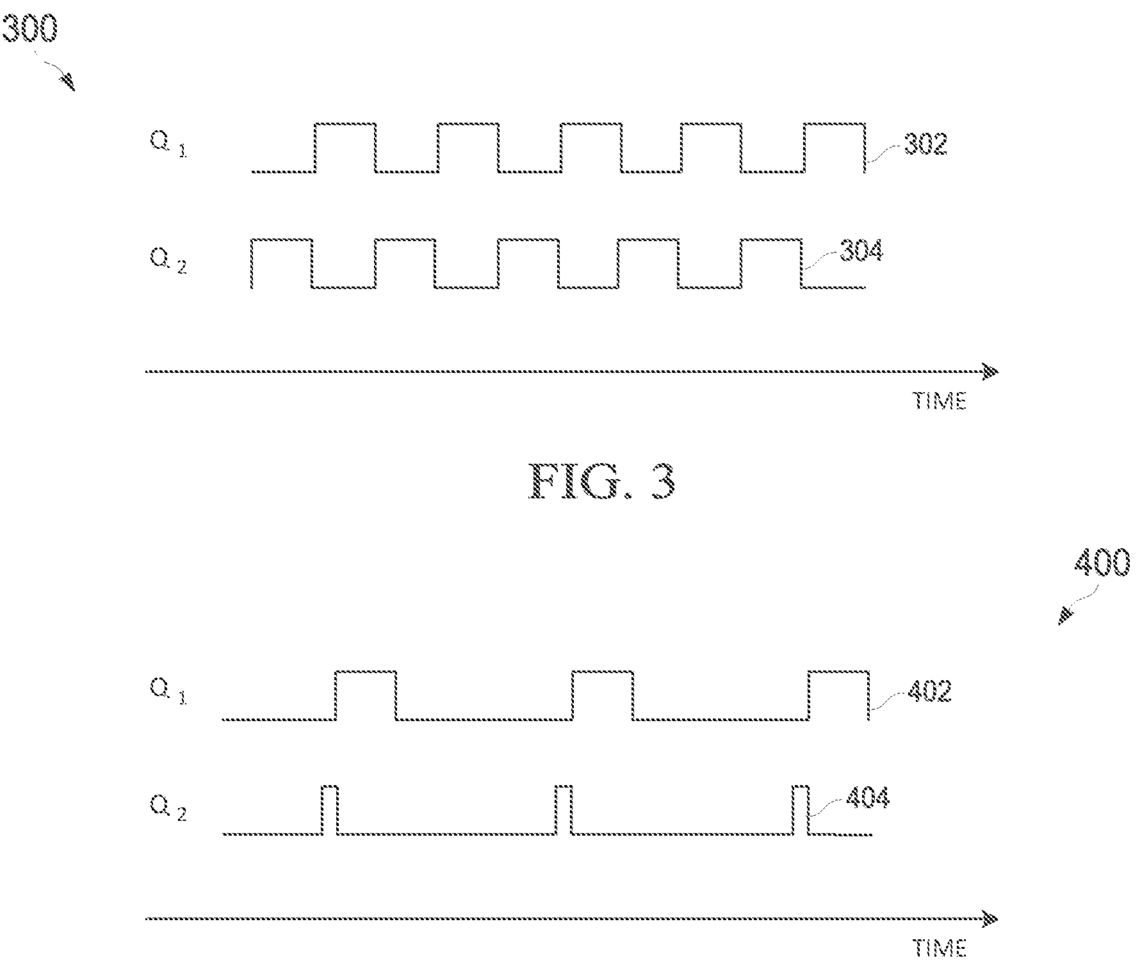
FIG. 3
FIG. 4
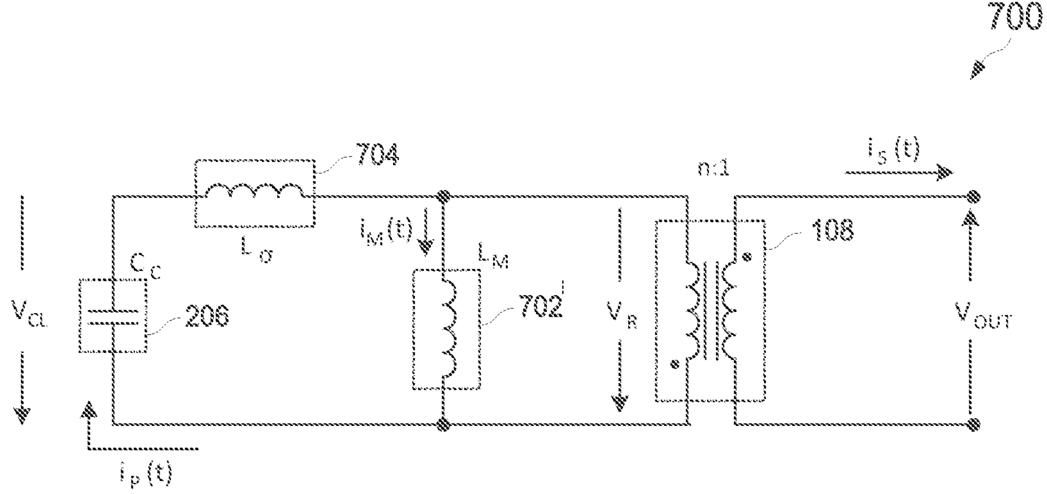
FIG. 7

AUTOMATIC REVERSE CURRENT ADJUSTMENT IN AN ACTIVE CLAMP FLYBACK CONVERTER

TECHNICAL FIELD

The present disclosure generally relates to power converters and, in particular embodiments, to automatic reverse current adjustment in an active clamp flyback converter.

BACKGROUND

Zero Voltage Switching (ZVS) in a converter refers to a switching technique where a power semiconductor switch (i.e., transistor) is turned on when there is zero voltage (or very close to zero) across its terminals (e.g., drain and source terminals). This contrasts with hard switching where the switch is turned on or off while voltage and current are present, leading to higher switching losses due to the simultaneous presence of voltage and current during the transition.

The primary advantage of achieving ZVS is reducing switching losses in the converter, especially at higher frequencies. By ensuring that the switch transitions occur at or near zero voltage, the energy dissipated during each switching event is minimized. This leads to improved efficiency, reduced thermal stress on the components, and can allow for higher operating frequencies.

In an active clamp flyback (ACF) converter aiming for optimal efficiency, the low-side switch operates under ZVS. To achieve this, the high-side switch remains active for a set duration. This allows a certain amount of primary current, which relates to the set duration, to flow in the reverse direction oppositely after the set duration. Determining the set duration and consequently, the precise reverse current value becomes crucial to achieve this goal. If the set duration is too low, ZVS isn't reached, leading to losses in the switch. Conversely, if the set duration is excessively high, while ZVS is achieved, increased conduction losses can negate its advantages.

Component variances and operational conditions influence existing techniques to adjust the reverse current. As a result, these techniques lack precision in consistently ensuring the desired ZVS state. An improvement on the conventional solutions is, thus, desirable.

SUMMARY

Technical advantages are generally achieved by embodiments of this disclosure, which describe automatic reverse current adjustment in an active clamp flyback converter.

A first aspect relates to a method. The method includes sensing a reverse current through a main switch of an active clamp flyback (ACF) converter. The ACF converter includes a flyback transformer and an auxiliary switch. The method further includes determining whether a sense voltage corresponding to the reverse current exceeds a threshold; decreasing a duration for the reverse current by an incremental time interval, the duration of the reverse current including a first incremental time interval, the duration of the reverse current corresponding to a duration that the auxiliary switch is activated; increasing the duration by a second incremental time interval greater than the first incremental time interval, the increasing being in response to the reverse current not exceeding the threshold; and activating the auxiliary switch for the duration to achieve zero voltage switching (ZVS).

A second aspect relates to an active clamp flyback (ACF) converter. The ACF converter including a flyback transformer including a primary winding and a secondary winding; a main switch coupled in series with the primary winding between a DC voltage node and a reference voltage node; a clamping circuit coupled across the primary winding, the clamp circuit including a capacitor and an auxiliary switch; and a controller configured to control activation and deactivation of the main switch and the auxiliary switch and to sense a reverse current through the main switch. The controller is configured to sense a reverse current through the main switch through a current sense node, determine whether a sense voltage corresponding to the reverse current exceeds a threshold, decrease a duration for the reverse current by an incremental time interval, the duration of the reverse current including a first incremental time interval, the duration of the reverse current corresponding to a duration that the auxiliary switch is activated, increase the duration by a second incremental time interval greater than the first incremental time internal, the increasing being in response to the reverse current not exceeding the threshold, and activate the auxiliary switch for the duration to achieve zero voltage switching (ZVS).

A third aspect relates to a system. The system including a load; a switching circuitry coupled to the load, the switching circuitry including an auxiliary switch and a main switch coupled in series between a supply voltage node and a reference voltage node; and a controller configured to control activation and deactivation of the main switch and the auxiliary switch and to sense a reverse current through the main switch. The controller configured to sense a reverse current through the main switch through a current sense node, determine whether a sense voltage corresponding to the reverse current exceeds a threshold, decrease a duration for the reverse current by an incremental time interval, the duration of the reverse current including a first incremental time interval, the duration of the reverse current corresponding to a duration that the auxiliary switch is activated, increase the duration by a second incremental time interval greater than the first incremental time interval, the increasing being in response to the reverse current not exceeding the threshold, and activate the auxiliary switch for the duration to achieve zero voltage switching (ZVS).

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which:

FIGS. 3 and 4 are comparative waveforms of the gating signals for a complementary control method and a non-complementary control method, respectively;

FIG. 7 illustrates a schematic of an equivalent circuit of the active clamp flyback converter in FIG. 2 during the OFF state of the low-side switch;

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of an active clamp flyback converter, it should also be appreciated that these inventive aspects may also apply to other types of power converters. In particular, aspects of this disclosure may similarly apply to power converters featuring a half-bridge structure that allows current reversal and power converters with switches that are synchronized to the zeroing of the reverse current. For example, embodiments of this disclosure may similarly apply to a power converter with a Triangular Current Mode (TCM) operated totem-pole power factor correction (PFC) topology.

Generally, in an active clamp flyback converter, a reverse current ($I_{REV}$) flows on the primary side of the transformer when the main switch of the active clamp flyback converter is in the OFF state. The reverse current helps deplete a drain capacitance of the active clamp circuit before the main switch is turned ON to achieve soft-switching (i.e., ZVS). In embodiments, a system, a circuit, and a method of operation are disclosed that automatically determines the duration of a reverse current ($I_{REV}$) to achieve ZVS in the main switch.

Figure 1:
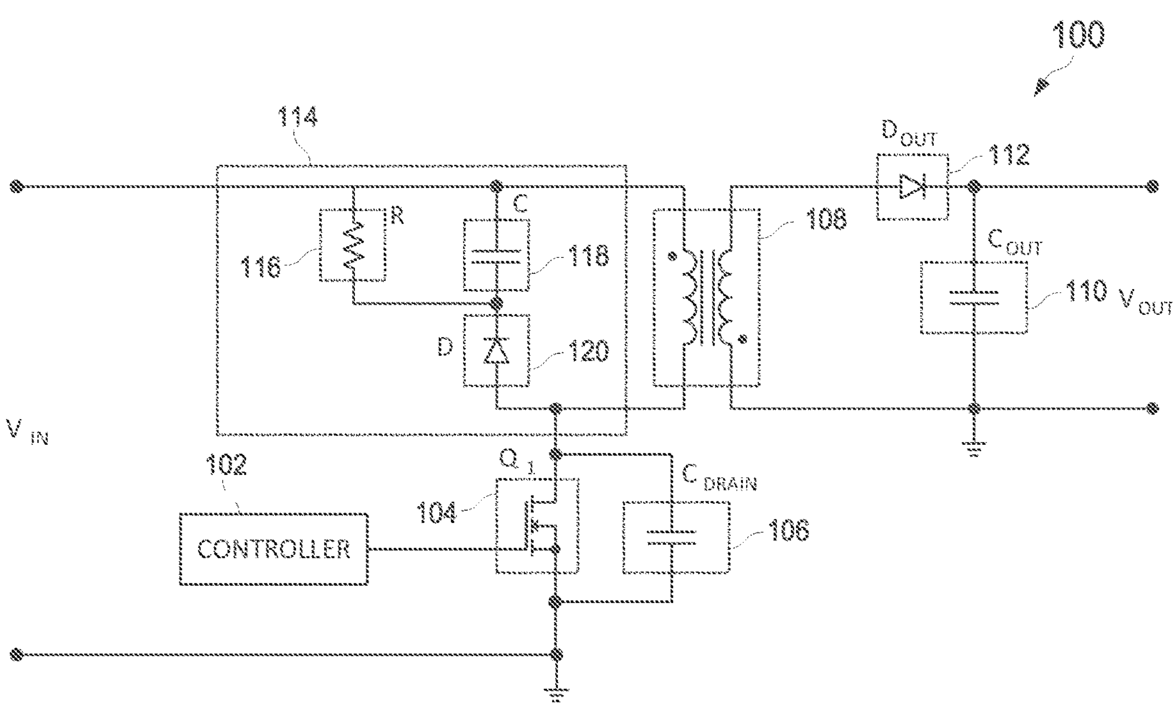
FIG. 1 is a schematic of a standard flyback converter.

FIG. 1 illustrates a schematic of a standard flyback converter 100. Standard flyback converter 100 includes a controller 102, a low-side switch ($Q_1$) 104, a drain capacitor ($C_{DRAIN}$) 106, a transformer 108, an output capacitor ($C_{OUT}$) 110, an output diode ($D_{OUT}$) 112, and an RCD clamp 114, which may (or may not) be arranged as shown. RCD clamp 114 includes a resistor (R) 116, a capacitor (C) 118, and a diode (D) 120. Standard flyback converter 100 may include additional components not shown, such as a load at the output.

Controller 102 dictates the operation of the standard flyback converter 100. Controller 102 generates the necessary control signals, typically in the form of pulse-width modulation (PWM), to regulate the output voltage ($V_{OUT}$) or current. Controller 102 monitors the output and adjusts the switching frequency or duty cycle to maintain a steady output under varying load and input conditions.

The low-side switch ($Q_1$) 104, often a metal-oxide-semiconductor field-effect transistor (MOSFET), is the main switching element of the standard flyback converter 100. Controller 102 drives the low-side switch ($Q_1$) 104, turning it ON and OFF at a specific frequency and duty cycle. When the low-side switch ($Q_1$) 104 is turned ON, energy is stored in the primary winding of the transformer 108. When the low-side switch ($Q_1$) 104 is turned OFF, this stored energy is transferred to the secondary winding of the transformer 108 and then to the output.

In embodiments, drain capacitor ($C_{DRAIN}$) 106 is not an external discrete component—although, an external capacitor can be added in some cases. The drain capacitor ($C_{DRAIN}$) 106 is a representation of the lump sum of the capacitances of parasitic contributors, such as the output capacitance (Coss) of the low-side switch ($Q_1$) 104, the end-to-end capacitance of the primary winding of the transformer 108, the junction capacitance (or Coss in case of synchronous rectification) of the secondary rectifier reflected to the primary side, plus other stray contributors. These parasitic contributors, are all dynamically in parallel to each other and effectively, from a circuit analysis standpoint, can be represented by a drain capacitor ($C_{DRAIN}$) 106.

The transformer 108 provides electrical isolation between the input ($V_{IN}$) and output ($V_{OUT}$). It also stores energy during the ON state of the low-side switch ($Q_1$) 104 (in its primary winding) and releases it to the load of the standard flyback converter 100 during the OFF state of the low-side switch ($Q_1$) 104 (i.e., through its secondary winding).

The output capacitor ($C_{OUT}$) **11*o* is located after the second winding of the transformer 108**. It filters out the high-frequency switching ripple, ensuring a stable and smooth DC output voltage ($V_{OUT}$). By storing energy, it also provides instantaneous power to the load during transient conditions.

The output diode ($D_{OUT}$) 112 allows current to flow from the secondary winding of the transformer 108 to the output during the OFF phase of the low-side switch ($Q_1$) 104 and blocks current during the ON phase, ensuring unidirectional current flow at the output.

The RCD clamp 114, or the Resistor-Capacitor-Diode clamp, is a protective circuitry added to manage voltage spikes that can occur due to the leakage inductance of the transformer 108. The resistor (R) 116 aids in dissipating energy, the capacitor (C) 118 absorbs voltage spikes, and the diode (D) 120 provides a path for the leakage energy to return, ensuring that voltage spikes do not exceed safe levels and thereby protecting the low-side switch ($Q_1$) 104.

Operationally, the standard flyback converter 100 switches the low-side switch ($Q_1$) 104 ON and OFF in a controlled manner. When the low-side switch ($Q_1$) 104 is in the ON state, energy is stored in the primary winding of the transformer 108. When the low-side switch ($Q_1$) 104 is in the OFF state, the stored energy is transferred to the secondary winding of the transformer 108, which is rectified, filtered, and supplied to a load at the output of the standard flyback converter 100.

Controller 102 constantly adjusts the operation of the standard flyback converter 100 based on feedback from the output to ensure that the desired output voltage ($V_{oUT}$) or current is maintained. The RCD clamp 114 ensures that any potential voltage spikes are managed and do not harm the converter's components.

While the standard flyback converter 100 offers the benefits of simplicity and cost-effectiveness, it comes with notable disadvantages. Notably, it transforms the energy from leakage inductance into heat, detrimentally impacting efficiency. Additionally, it restricts the use of high switching frequencies and produces waveforms that are sharp and jagged, leading to significant electromagnetic interference (EMI).

Figure 2:
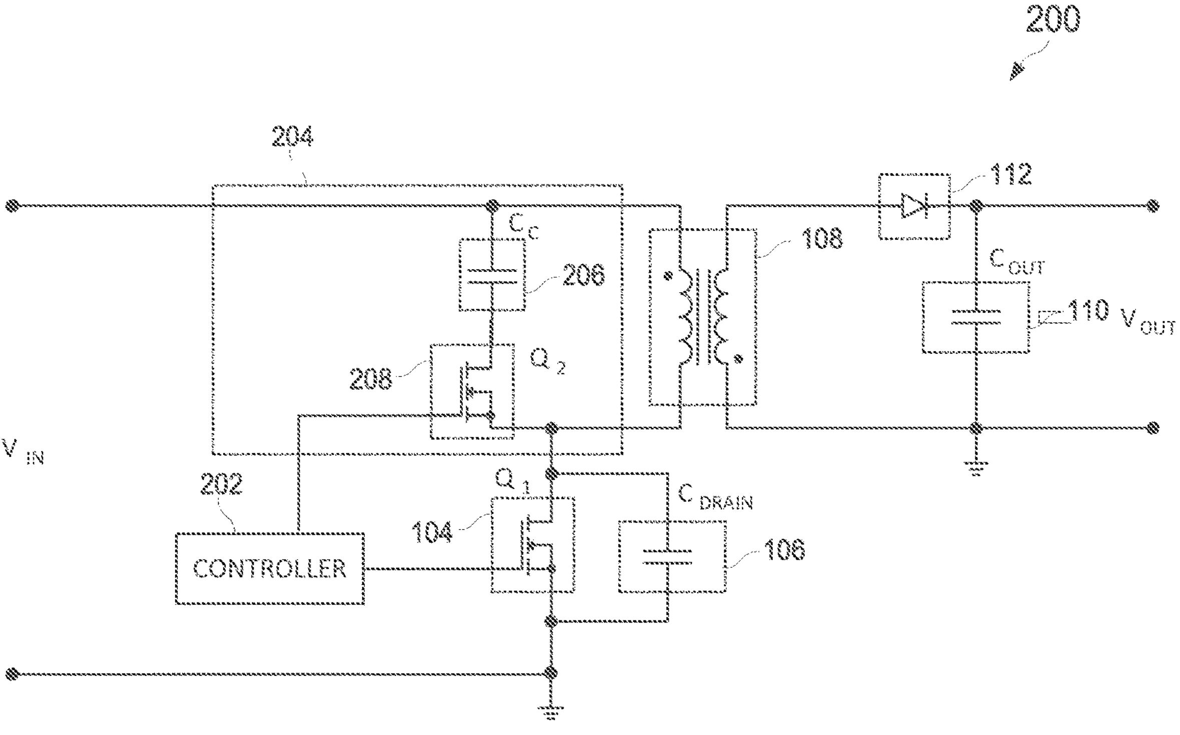
FIG. 2 is a schematic of an active clamp flyback converter.

FIG. 2 illustrates a schematic of an active clamp flyback converter 200. Active clamp flyback converter 200 includes a controller 202, the low-side switch ($Q_1$) 104, the drain capacitor ($C_{DRAIN}$) 106, the transformer 108, the output capacitor ($C_{OUT}$) 110, the output diode ($D_{OUT}$) 112, and an active clamp 204, which may (or may not) be arranged as shown. Active clamp 204 includes a clamp capacitor ($C_C$) 206 and a high-side switch ($Q_2$) 208 (i.e., auxiliary switch). Active clamp flyback converter 200 may include additional components not shown, such as a load at the output or an optional clamp resistor arranged in parallel with the clamp capacitor ($C_C$) 206.

Controller 202 dictates the precise timing and duration for the low-side switch ($Q_1$) 104 and the high-side switch ($Q_2$) 208. Controller 202 is responsible for ensuring efficient energy transfer and regulating the output voltage ($V_{OUT}$) or current by coordinating the operation of both switches.

The operations of the low-side switch ($Q_1$) 104, the drain capacitor ($C_{DRAIN}$) 106, the transformer 108, the output capacitor ($C_{OUT}$) 110, and the output diode (DOUT) 112 are similar to those as described with respect to the standard flyback converter 100, and for brevity are not repeated.

The active clamp 204, a distinguishing feature of the active clamp flyback converter 200, includes the high-side switch ($Q_2$) 208 and the clamp capacitor ($C_C$) 206. Together, they recycle the energy stored in the leakage inductance of the transformer 108, reducing voltage spikes and improving efficiency. The high-side switch ($Q_2$) 208 provides a controlled path for this energy, while the clamp capacitor ($C_C$) 206 temporarily stores and releases the energy.

Operationally, when the low-side switch ($Q_1$) 104 is activated, the current flows into the primary winding of the transformer 108, storing energy. Upon deactivating the low-side switch ($Q_1$) 104, the energy moves to the secondary winding due to the collapsing magnetic field and is then channeled to the output via the output diode ($D_{OUT}$) 112. Simultaneously, in a complementary control setup, the high-side switch ($Q_2$) 208 in the active clamp 204 is turned ON, providing a pathway for any excess energy (from the transformer's leakage inductance) to the clamp capacitor ($C_C$) 206, thus preventing harmful voltage spikes. This active clamp operation enhances efficiency and prolongs the life of components. Controller 202 synchronizes the operation of the low-side switch ($Q_1$) 104 and the high-side switch ($Q_2$) 208 to maintain a regulated output. In embodiments, in a non-complementary control setup, the clamp capacitor ($C_C$) 206 is charged via the body diode (not shown) of the high-side switch ($Q_2$) 208 regardless of whether the high-side switch ($Q_2$) 208 is in the OFF state.

Despite the increased complexity of the active clamp flyback converter 200, mainly because of the driving needs of the high-side switch ($Q_2$) 208, it has the benefit of utilizing the energy from leakage inductance to attain soft-switching (i.e., ZVS) for the low-side switch ($Q_1$) 104 and high-side switch ($Q_2$) 208. Active clamp flyback converter 200 can reach an efficiency of over 93% even at high switch frequencies beyond 200 kHz. Additionally, the active clamp flyback converter 200 produces smooth waveforms with very limited electromagnetic interference.

FIGS. 3 and 4 illustrate comparative waveforms 300, 400 of the gating signals for a complementary control method and a non-complementary control method for operating the active clamp flyback converter 200, respectively. In each of FIGS. 3 and 4, a first gating signal 302, 402 at the gate terminal of the low-side switch ($Q_1$) 104 and a second gating signal 304, 404 at the gate terminal of the high-side switch ($Q_2$) 208, originating from controller 202, is shown.

Under the complementary control method, the first gating signal 302 and the second gating signal 304 operate in a mutually exclusive manner, such that when one switch is ON (i.e., activated), the other is OFF (i.e., deactivated), and vice versa. Under this method, the low-side switch ($Q_1$) 104 and the high-side switch ($Q_2$) 208 never operate simultaneously.

It should be apparent, that even in the case of complementary control, there is a short dead time between the turn-off of one switch and the turn-ON of the other, where both switches are in the OFF state. This is key not only to prevent simultaneous conduction, which could be catastrophic but also to achieve ZVS, as it allows time for the voltage at the drain terminal of the low-side switch ($Q_1$) 104 to transition from a high to a low or from a low to a high logic level state.

Under the non-complementary control method, a deliberate pause or "dead time" is introduced between the deactivation of one switch and the activation of the other. This intentional delay ensures a brief moment when both switches are OFF. Further, the same (or, in general, similar in duration) dead time is inserted after the turn-off of both switches. Generally, a dead time in the strictest sense is inserted between the turn-off of the high-side switch ($Q_2$) 208 and the turn-on of the low-side switch ($Q_1$) 10, while after the turn-off of the low-side switch ($Q_1$) 10 there is controlled delay-typically, depending on the converter's operating conditions-rather than a dead time. Generally, the dead time is intended to be short in duration, while the controlled delay is longer.

Complementary control method ensures a continuous path for the current, either through the primary winding of the transformer 108 or the clamp capacitor ($C_C$) 206, depending on which switch is ON. However, this continuous switching can lead to higher Root Mean Square (RMS) currents on the primary side, potentially causing increased power losses. One of the main challenges with the complementary control method is its limited flexibility in handling a broad range of input and output voltages, especially when trying to meet modern power requirements, such as those of universal serial bus (USB) power delivery (PD).

Although, ZVS can be achieved under complementary and non-complementary control, the key advantage of the non-complementary control is that ZVS is achieved with a lower RMS primary current. With ZVS, the next switch can turn ON when the voltage across it is minimal, reducing switching losses and enhancing the overall efficiency of the active clamp flyback converter 200. The non-complementary control method, with its inherent advantages, tends to produce lower RMS currents in the primary circuit, leading to reduced power losses. Additionally, this strategy offers a more adaptive approach to managing varied input and output voltage ranges, making it particularly suitable for modern power delivery standards.

Figure 5:
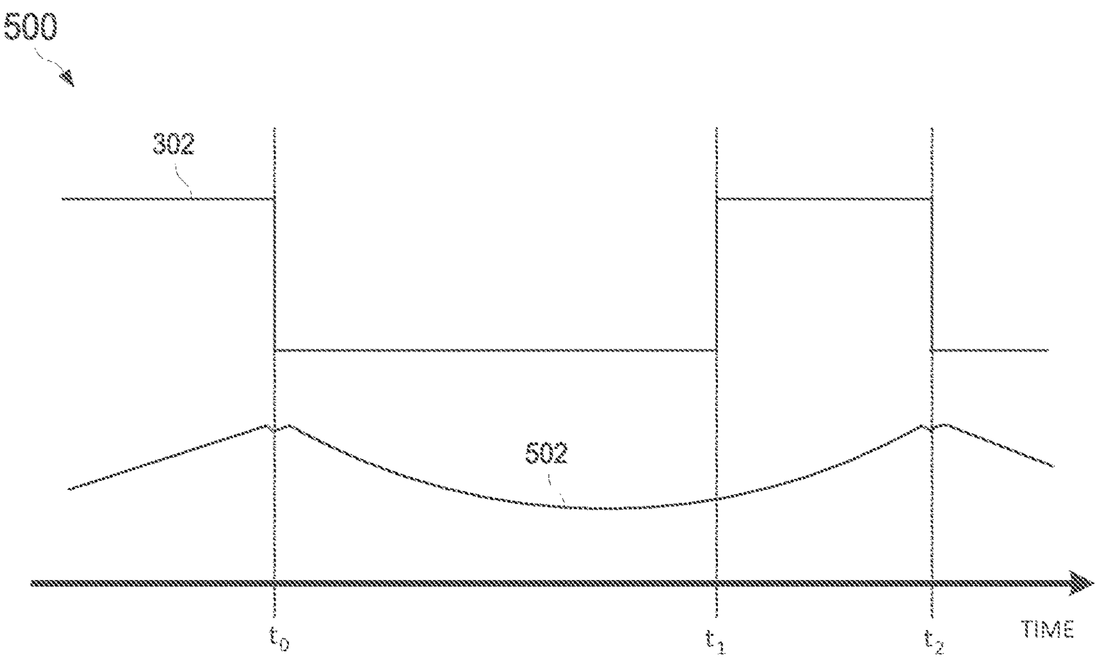
FIG. 5 is an illustration of the operation of the active clamp flyback converter operating under the complementary control method.

FIG. 5 illustrates the operation of the active clamp flyback converter 200 operating under the complementary control method. Specifically, the primary side current 502 in the primary winding of the transformer 108 is illustrated in reference to the first gating signal 302 of the complementary control method. During time $t_0$ to time $t_1$, the low-side switch ($Q_1$) 104 is in the OFF state. At time $t_1$, the low-side switch ($Q_1$) 104 is activated and is in the ON state.

In addition to the primary side current 502 during the ON-time of the low-side switch ($Q_1$) 104 from time $t_1$ to time $t_2$, a significant amount of current is flowing through the primary side current 502 during the OFF-time of the low-side switch ($Q_1$) 104 from time $t_0$ to time $t_1$. The current flowing through the primary side current 502 during the OFF-time of the low-side switch ($Q_1$) 104 from time $t_0$ to time $t_1$ generates conduction losses on the resistance of the primary winding of the transformer 108. Thus, in addition to the power losses due to the conduction of low-side switch ($Q_1$) 104 during the ON-time from time $t_1$ to time $t_2$, there are conduction losses during the OFF-time of the low-side switch ($Q_1$) 104 from time $t_0$ to time $t_1$. This results in higher Root Mean Square (RMS) currents on the primary side, causing increased power losses.

Figure 6:
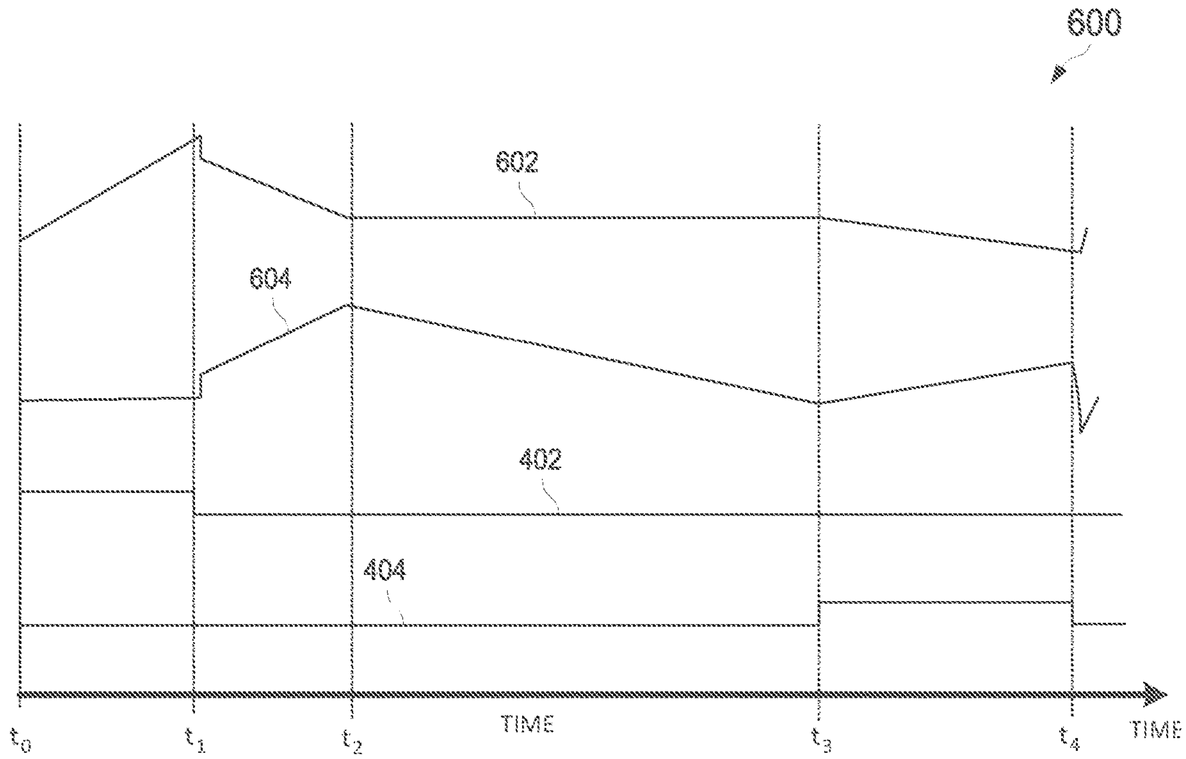
FIG. 6 is an illustration of the operation of the active clamp flyback converter operating under the non-complementary control method.

FIG. 6 illustrates the operation of the active clamp flyback converter 200 operating under the non-complementary control method. Specifically, the primary side current 602 in the primary winding of the transformer 108 and the secondary side current 604 through the secondary winding of the transformer 108 are illustrated in reference to the first gating signal 402 and the second gating signal 404 of the non-complementary control method. The high-side switch ($Q_2$) 208 is switched ON in response to the secondary side current 604 going to zero.

During time $t_0$ and time $t_1$, the low-side switch (Q) 104 is in the ON state. At time $t_1$, the low-side switch ($Q_1$) 104 is deactivated. During time $t_0$ to time $t_3$, the high-side switch ($Q_2$) 208 is in the OFF state. At time $t_3$, the high-side switch ($Q_2$) 208 is activated. At time $t_4$, the high-side switch ($Q_2$) 208 is deactivated. Between time $t_1$ and time $t_3$, the low-side switch (Q) 104 and the high-side switch ($Q_2$) 208 are deactivated.

During the ON time of the low-side switch (Q) 104, from time $t_0$ to time $t_1$, the primary side current 602 is ramping up from a zero value at time $t_0$ to a maximum peak current value at time $t_1$. At time $t_1$, the first gating signal 402 transitions, and the low-side switch (Q) 104 is deactivated, resulting in the primary side current 602 going to zero at time $t_2$. Between time $t_1$ and time $t_2$, the clamp capacitor ($C_C$) 206 is re-charging and the secondary side current 604 is ramping up from a zero value at time $t_1$ to a maximum peak current value at time $t_2$. At time $t_2$, once the clamp capacitor ($C_C$) 206 is recharged (e.g., the voltage across the clamp capacitor ($C_C$) 206 rising slightly over the reflected voltage (VR) (i.e., the output voltage (VOUT) multiplied by the primary-to-secondary turn ratio), the secondary side current 604 gradually ramps down from the maximum peak current value at time $t_2$ to a zero value at time $t_3$.

At time $t_3$, the high-side switch ($Q_2$) 208 is activated in response to the secondary side current 604 having a zero value. The primary side current 602 operates in the reverse direction (i.e., negative current value) from time $t_3$ to time $t_4$. When the primary side current 602 operates in the reverse direction from time $t_3$ to time $t_4$, the secondary side current 604 ramps from the zero value at time $t_3$ to a second maximum peak current value at time $t_4$. A current flowing on the primary side current 602 during the OFF state is in a direction that is opposite to the current flow of the primary side current 602 during the ON state.

To properly operate the active clamp flyback converter 200 under the non-complementary control method and to achieve ZVS for the low-side switch ($Q_1$) 104, the operation of the primary side current 602 needs to be actively managed when flowing in the reverse direction from time $t_3$ to time $t_4$. The management of the primary side current 602 when operating in the reverse direction provides sufficient energy to cause the half-bridge mid-point to transition from a high level to a low level completely within the dead time.

If the duration for the primary side current 602 when flowing in the reverse direction is too short, the voltage of the half-bridge mid-point will not transition to zero, resulting in increased switching losses. In contrast, if the duration for the primary side current 602 when flowing in the reverse direction is too long, the voltage of the half-bridge mid-point will properly transition to zero but as the primary side current 602 generate conduction losses, the additional losses will overcome any benefits provided by the soft switching afforded by the active clamp flyback converter 200.

FIG. 7 illustrates a schematic of an equivalent circuit 700 of the active clamp flyback converter 200 during the OFF state of the low-side switch ($Q_1$) 104 between time $t_3$ and time $t_4$. In response to the primary side current 602 flowing in the reverse direction when the high-side switch ($Q_2$) 208 is activated, current flows on the secondary winding of the transformer 108, and the active clamp flyback converter 200 operates similarly to a real transformer.

To illustrate the leakage inductance of the transformer 108, a magnetizing inductance ($L_M$) 702 (i.e., stores energy that can be transferred to the secondary side) and a leakage inductance ($L_6$) 704 (i.e., stores energy that cannot be transferred to the secondary side) are included.

The primary side current 602 (i.e., current flowing in the reverse direction) at a specific moment in time (t) is illustrated as $i_P(t)$, the magnetizing current at a specific moment in time (t) is illustrated as $i_M(t)$, and the secondary side current 604 at a specific moment in time (t) is illustrated as $i_S(t)$.

The relationship between $i_P(t)$ and $i_M(t)$ can be represented by the equation:

$$i_p(t) = -\frac{V_{CL}(0) - V_R}{Z_C} \times \sin(\omega_C(t)) + i_M(t),$$

where $Z_C$ is the characteristic impedance of the resonant circuit comprising the leakage inductance ($L_o$) 704 and the clamp capacitor ($C_C$) 206, which can be represented as $$Z_C = \sqrt{\frac{L_\sigma}{C_{CL}}}.$$

The resonant frequency $\omega_C$ associated with the resonant circuit can be represented as $$\omega_C = \frac{1}{\sqrt{L_\sigma \times C_{CL}}}.V_{CL}(0)$$

is the voltage of the clamp capacitor ($C_C$) 206 at time instant $t_3$ (equal to the value at the time instant $t_2$, i.e., at the end of the charging phase) and the reflected voltage $V_R$ is the voltage across the primary winding of the transformer 108 when the high-side switch ($Q_2$) 208 is activated. This is due to the clamp capacitor ($C_C$) 206 being isolated and retaining its voltage during the time interval between time $t_2$ and time $t_3$ corresponding to the high-side switch ($Q_2$) 208 being in the OFF state.

The magnetizing current $i_M(t)$, which has a linear ramp, can be represented by the equation:

$$i_M(t) = -\frac{V_R}{L_M} \times t.$$

The magnetizing current $i_M(t)$ is used to determine whether ZVS is achieved by the active clamp flyback converter 200.

The relationship between $i_P(t)$, $i_M(t)$, and $i_S(t)$ can be represented by the equation:

$$i_S(t) = -n \times [i_p(t) - i_M(t)],$$

where $$n = \frac{N_P}{N_S}$$

is the ratio of the number of turns on the primary winding ($N_P$) to the number of turns on the second winding ($N_S$).

To achieve soft-switching, the theoretical minimum amplitude of the reverse current ($I_{REV}$) of the primary side current 602 is approximately equal to $$\sqrt{\frac{C_{DRAIN}}{L_M + L_\sigma}} \times \sqrt{V_{IN}^2 + V_R^2},$$

where $V_R = n \times V_{OUT}$. In modern power delivery applications, such as in USB-PD applications, where the input voltage ($V_{IN}$) and the output voltage ($V_{OUT}$) are changing in value, obtaining an exact reverse current ($I_{REV}$) can be challenging to mathematically calculate or look-up from a table given variances in component values during manufacturing.

A conventional solution to achieve ZVS for the low-side switch ($Q_1$) 104 has been to set the duration from time $t_3$ to time $t_4$ where the primary side current 602 flows in the reverse direction. Assuming that the squared value of the input voltage ($V_{IN}$) is much greater than the squared value of the reflected voltage $V_R$ across the primary side of the transformer 108 (i.e., $V_{IN}/V_R >> 1$), the duration from time $t_3$ to time $t_4$ can be programmed to be directly proportional to the input voltage ($V_{IN}$) and inversely proportional to the output voltage ($V_{OUT}$). Disadvantageously, in this solution, the reverse current ($I_{REV}$) is sensitive to the parameter tolerances of the magnetizing inductance ($L_M$) 702, the leakage inductance ($L_o$) 704, and the drain capacitor ($C_{DRAIN}$) 106. Further, the approximate relationship does not guarantee adequate duration from time $t_3$ to time $t_4$ to achieve ZVS in all operating conditions.

Another conventional solution to achieve ZVS has been to use a sensor to monitor the drain voltage of the low-side switch ($Q_1$) 104. In this solution, the duration from time $t_3$ to time $t_4$ is automatically adjusted to have the drain voltage of the low-side switch ($Q_1$) 104 below a set voltage. Disadvantageously, the solution does not ensure that ZVS will be achieved. Further, the solution lacks fine-tuning options and requires an additional capacitor and an external depletion type MOSFET, which is limited in availability and costly to implement. Moreover, the solution requires two pins of the control IC dedicated for this purpose.

FIGS. 8A-D respectively illustrate a schematic of an embodiment timing circuit 800, an adjustment circuit 806, a filter circuit 808, and a reverse timer circuit 824. FIG. 9 illustrates a flow chart of an embodiment method 900 for self-adjusting the reverse current ($I_{REV}$) 1018 for the active clamp flyback converter 200 using the timing circuit 800 during the OFF state of the low-side switch ($Q_1$) 104 between time $t_3$ and time $t_4$. It is noted that all steps outlined in the flow chart of method 900 are not necessarily required and can be optional. Further, changes to the arrangement of the steps, removal of one or more steps and path connections, and addition of steps and path connections are similarly contemplated.

Figure 10:
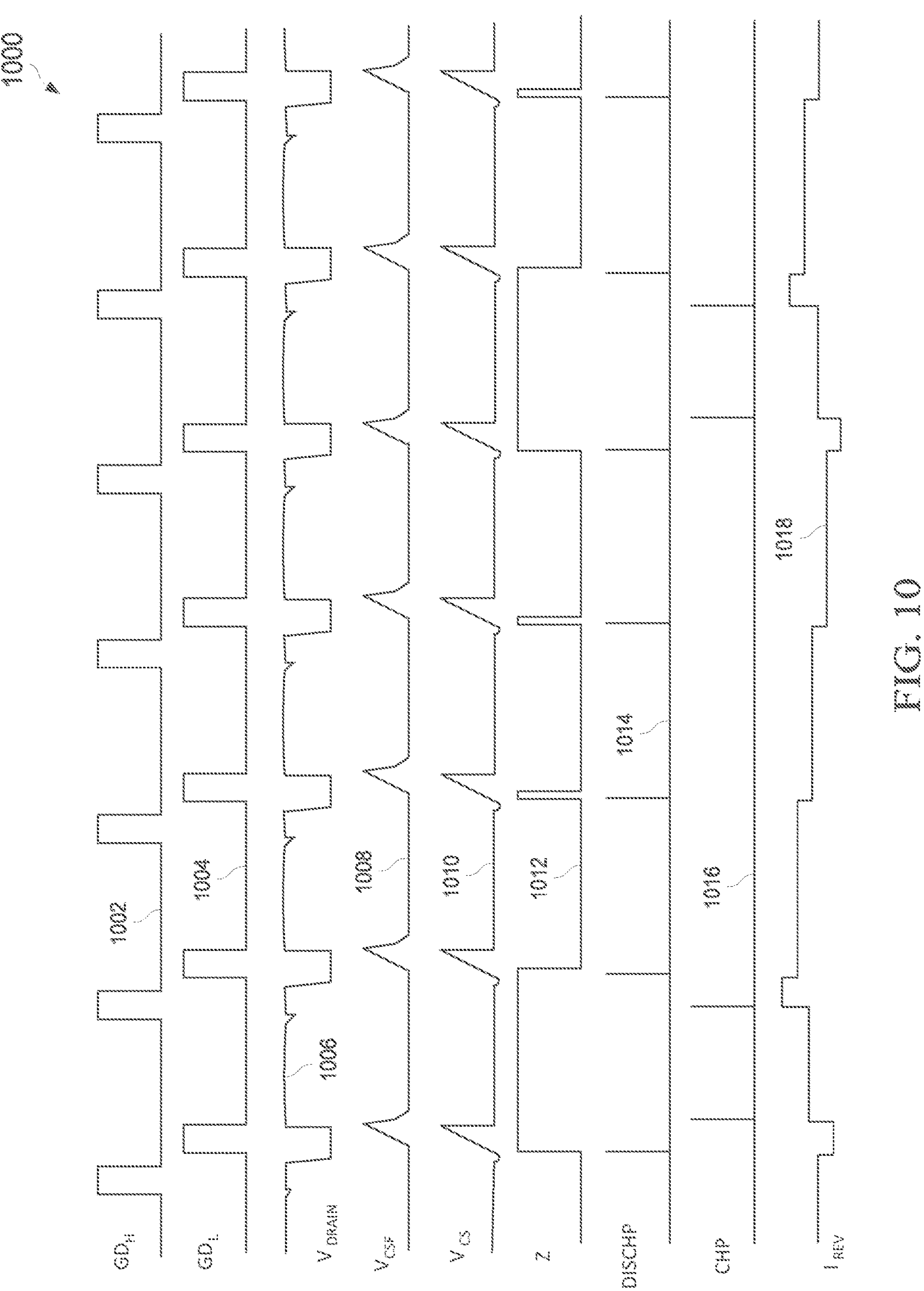
FIG. 10 are embodiment waveforms for the operation of the timing circuit based on the method of FIG. 9.
Figure 11:
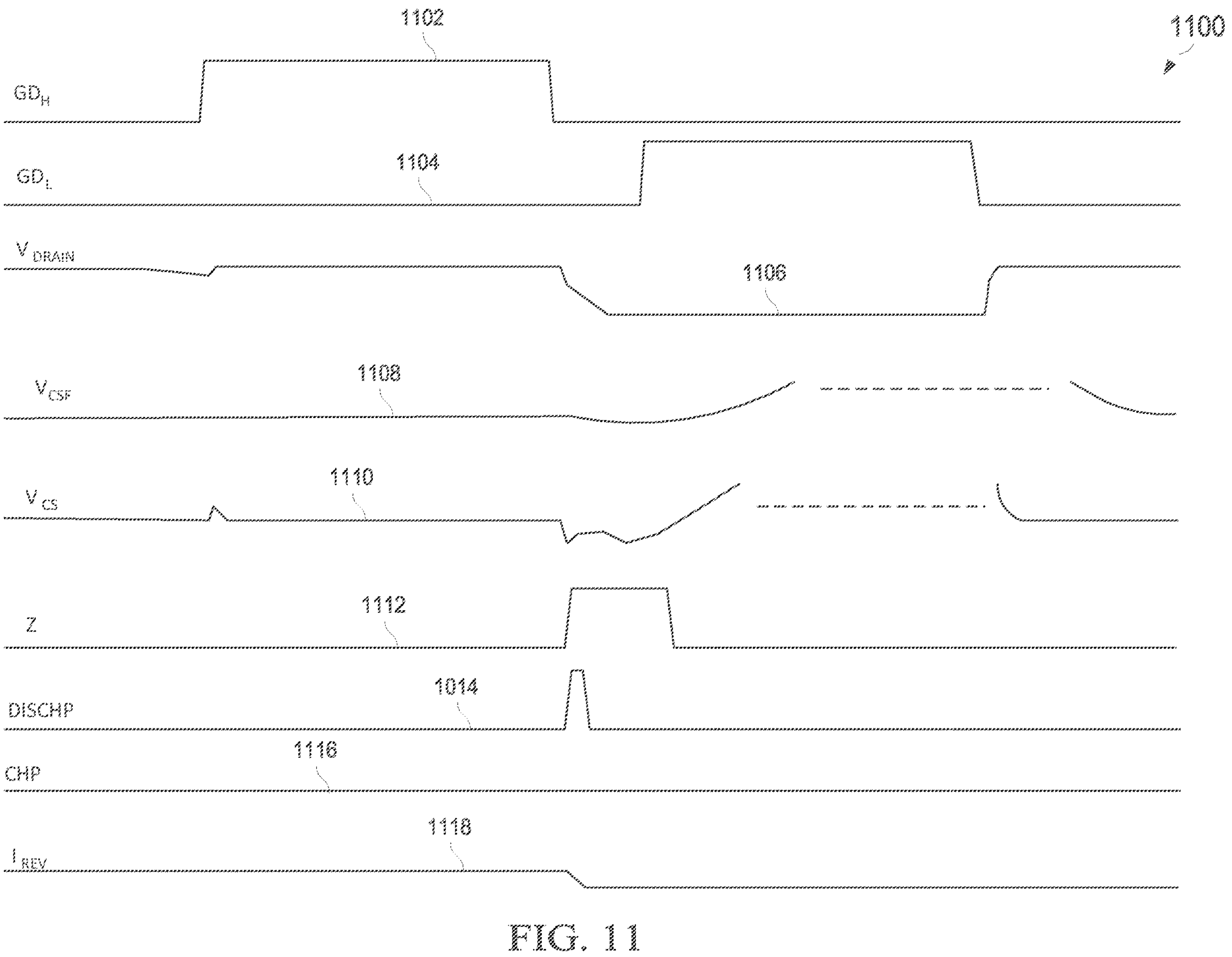
FIG. 11 is an embodiment of zoomed-in waveforms for the operation of the timing circuit based on the method of FIG. 9.
Figure 12:
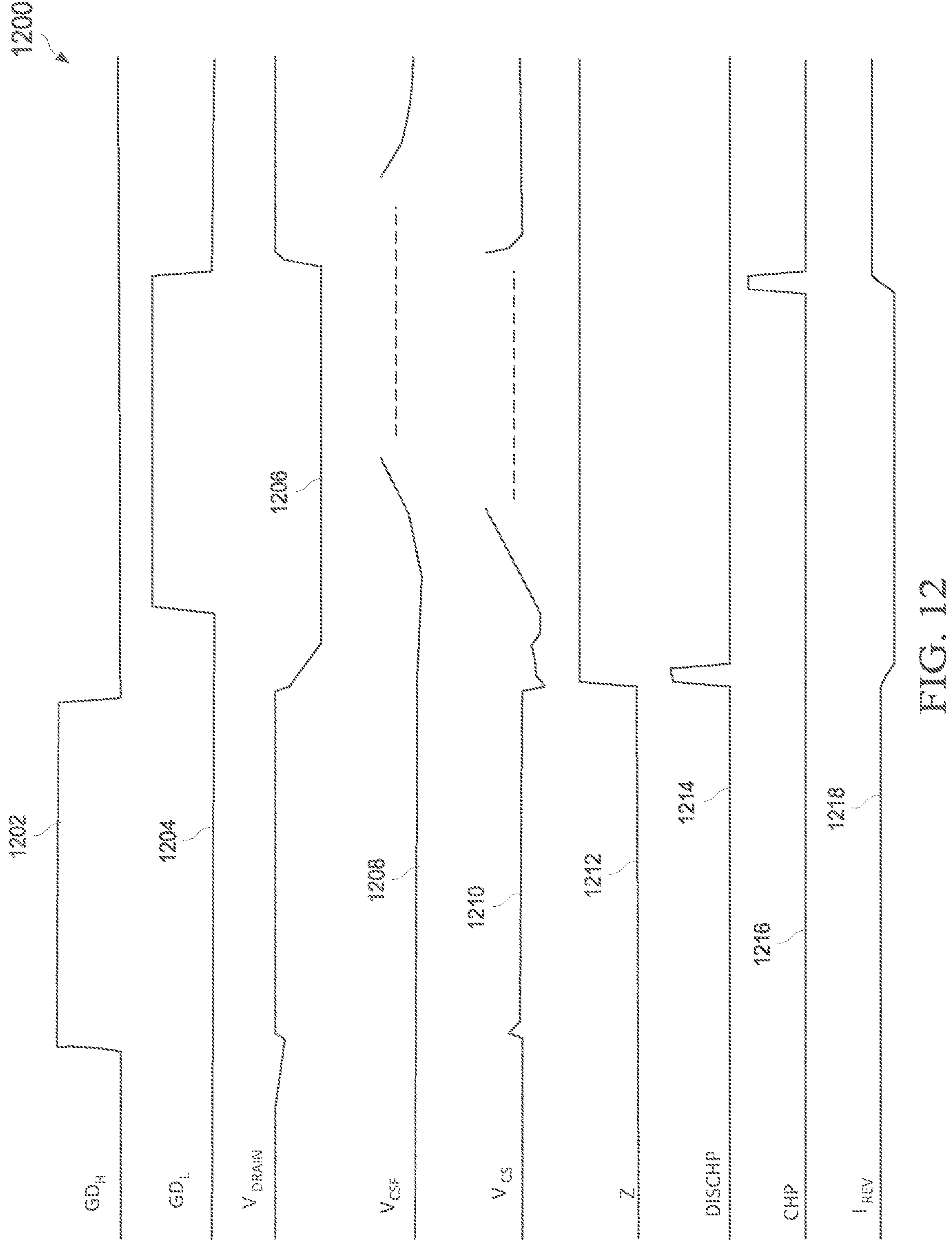
FIG. 12 is an embodiment of zoomed-in waveforms for the operation of the timing circuit based on method of FIG. 9.

FIG. 10 illustrates embodiment waveforms 1000 for the operation of the timing circuit 800 based on the method 900. FIG. 11 illustrates embodiment of zoomed-in waveforms 1100 for the operation of the timing circuit 800 based on the method 900 when the current sense voltage ($V_{CS}$) 1110, in the instant when Q1 is turned on, is more negative than the (negative) threshold ($V_{CS\_TH}$). FIG. 12 illustrates embodiment of zoomed-in waveforms 1200 for the operation of the timing circuit 800 based on method 900 when the current sense voltage ($V_{CS}$) 1110 in the instant when Q1 is turned on is less negative than the threshold ($V_{CS\_TH}$).

In embodiments, method 900 utilizes a fine-tuning element ($R_{FT}$) 804, to check for the necessary conditions for ZVS. The fine-tuning element ($R_{FT}$) 804 in combination with the current output from adjustment circuit 806 generates a positive offset voltage that allows the reset of the circuit to effectively see a voltage higher than that across the sense resistor ($R_S$) 802. Effectively, this is equivalent to shifting the threshold ($V_{CS\_TH}$) to more negative values.

The timing circuit 800 and method 900 provide a solution to automatically adjust the duration between time $t_3$ and time $t_4$ to achieve ZVS—or, if required for efficiency reasons, programmed to be near ZVS. In embodiments, the value of the fine-tuning element (RIFT) 804 can be finely tuned to achieve near ZVS or achieve ZVS. Advantageously, unlike the conventional solutions, the timing circuit 800 does not require dedicated pins.

Regardless of the power converter solution, a necessary condition for a switch to turn ON with ZVS is that at the instant of the turning ON of the switch, there must be a current that is flowing from the source terminal to the drain terminal (i.e., the drain to source voltage ($V_{DS}$) is negative). This current is called "reverse" because generally, the current flows from drain to source in a MOSFET switch.

For this condition to be sufficient, the reverse current ($I_{REV}$) must be greater than the minimum amount required to completely drain the drain capacitor ($C_{DRAIN}$) 106 during the dead time in the operation of the active clamp flyback converter 200. If the energy stored in the leakage inductance ($L_6$) 704, proportional to the reverse current ($I_{REV}$), exceeds the minimum amount, the drain capacitor ($C_{DRAIN}$) 106 can completely deplete.

In the case of a MOSFET switch, this reverse current flows from the source terminal to the drain terminal through the body diode of the switch. In the case of a Gallium Nitride (GaN) High-Electron-Mobility-Transistor (HEMT) switch, the current flows from the source terminal to the drain terminal in a reverse conduction mode. In embodiments, the present disclosure checks that this condition (i.e., current flowing from the source terminal to the drain terminal of the switch that exceeds a minimum value) is met. If the condition is not met, embodiments of this disclosure provide a solution that increases the duration of the reverse conduction until this condition is met.

Generally, a sense resistor is placed between the source terminal of a main switch and ground to sense the primary side current during the ON time. The sensing is typically performed through a dedicated pin in the control integrated circuit to perform peak current mode control. Embodiments of this disclosure use the same dedicated pin and the sense resistor to sense the reverse current (if any) flowing through the primary side winding of transformer 108 immediately before activation of the main switch. Thus, embodiments of this disclosure use an existing component within a typical power converter without any additional dedicated pins to achieve ZVS or near ZVS.

Timing circuit 800 includes a fine-tuning element ($R_{FT}$) 804, an optional adjustment circuit 806, a filter circuit 808, an adder circuit 810, a first comparator ($COMP_1$) 812, a first inverter 814, a second inverter 816, a first AND gate 818, a first flip-flop ($FF_1$) 820, a second AND gate 822, a reverse timer circuit 824, and a second flip-flop ($FF_2$) 826, which may (or may not) be arranged as shown. The output (Q) of the second flip-flop ($FF_2$) 826 is coupled to the high-side switch ($Q_2$) 208 through, for example, a gate driver (not shown). Timing circuit 800 may include additional components not shown. In embodiments, the first flip-flop ($FF_1$) 820 and the second flip-flop ($FF_2$) 826 are an edge-sensitive SR (Set-Reset) type flip-flop.

The optional adjustment circuit 806 includes a third flip-flop ($FF_3$) 828 and a first current generator 830, which may (or may not) be arranged as shown. In embodiments, the first current generator 830 is activated for a set period.

The filter circuit 808 includes a first capacitor ($C_1$) 832 and a resistor ($R_1$) 834, which may (or may not) be arranged as shown. In embodiments, filter circuit 808 is a low-pass filter. Filter circuit 808 is configured to filter out noise, interference, and voltage spikes, resulting in a cleaner signal at the inverting input of the first comparator ($COMP_1$) 812.

The reverse timer circuit 824 includes a first mono-flop ($MF_1$) 836, a second mono-flop ($MF_2$) 838, a second current generator 840, a second capacitor ($C_2$) 842, a third current generator 844, a fixed current generator 846, a switch (SW) 848, a third capacitor ($C_3$) 850, and a second comparator ($COMP_2$) 852, which may (or may not) be arranged as shown. The output of the second AND gate 822 is coupled to the input of the first mono-flop ($MF_1$) 836. The output of the second comparator ($COMP_2$) 852 is coupled to the "Reset" (R) input of the second flip-flop ($FF_2$) 826.

In embodiments, the first mono-flop ($MF_1$) 836, the second mono-flop ($MF_2$) 838, the second current generator 840, the second capacitor ($C_2$) 842, and the third current generator 844 form a reverse current timer programming circuit 823 of the reverse timer circuit 824. Alternatively, in embodiments, the reverse current timer programming circuit 823 is implemented digitally as an up-down counter.

In embodiments, the fixed current generator 846, the switch (SW) 848, and the third capacitor ($C_3$) 850 form a reverse current timer circuit 825 of the reverse timer circuit 824. Alternatively, in embodiments, the reverse current timer circuit 825 is implemented digitally as an up counter.

In embodiments, the second comparator ($COMP_2$) 852 is implemented as a digital comparator when the reverse current timer programming circuit 823 and the reverse current timer circuit 825 are implemented digitally.

As shown, the sense resistor ($R_S$) 802 is arranged between the source terminal of the low-side switch ($Q_1$) 104 and ground, through which the primary side current ($i_p(t)$) flows. The fine-tuning element ($R_{FT}$) 804 has a first terminal coupled to the common node between the sense resistor ($R_S$) 802 and the source terminal of the low-side switch ($Q_1$) 104. A second terminal of the fine-tuning element ($R_{FT}$) 804 is coupled to a current sense (CS) node 805 (e.g., pin of the control IC) of the timing circuit 800. The drain voltage ($V_D$) 1006, 1106, 1206 of the low-side switch ($Q_1$) 104 is shown in FIGS. 10, 11, and 12.

The filtered current sense voltage ($V_{CSF}$) 1008, 1108, 1208 at the filtered current sense ($V_{CSF}$) node 807 is to be checked against a threshold ($V_{CS\_TH}$) using the timing circuit 800. In embodiments, the filtered current sense voltage ($V_{CSF}$) 1008, 1108, 1208 at the filtered current sense ($V_{CSF}$) node 807 at the inverting input of the first comparator ($COMP_1$) 812 is approximately equal to the current sense voltage ($V_{CS}$) 1010, 1110, 1210 at the current sense (CS) node 805, which itself is equal to the voltage across the sense resistor ($R_S$) 802—although filtered through the filter circuit 808.

The first comparator ($COMP_1$) 812 is configured with hysteresis-its past states influence its output due to the feedback connection via the adder circuit 810. Adder circuit 810 has a first input configured to receive the threshold ($V_{CS\_TH}$) and a second input configured to receive the comparator output. The first comparator ($COMP_1$) 812 has an inverting input (-) configured to receive the filtered current sense voltage ($V_{CSF}$) 1008, 1108, 1208. The first comparator ($COMP_1$) 812 is configured to receive the summed value of threshold ($V_{CS\_TH}$) and the comparator output. The first comparator ($COMP_1$) 812 is configured to generate an output signal fed to a first input of the first AND gate 818. It should be noted that in embodiments, other techniques apart from an adder circuit can be used to implement hysteresis.

The first inverter 814 is configured to receive the gating signal ($GD_H$) 1002, 1102, 1202—used to drive the high-side switch ($Q_2$) 208, and generate an inverted signal ($GD_{HN}$). In embodiments, the gating signal ($GD_H$) 1002, 1102, 1202 is at a logic level high when the high-side switch ($Q_2$) 208 is in the ON state and at a logic level low when the high-side switch ($Q_2$) 208 is in the OFF state. The inverted signal ($GD_{HN}$) is fed to the "Set" (S) input of the first flip-flop ($FF_1$) 820.

The first AND gate 818 is configured to receive the output signal from the first comparator ($COMP_1$) 812 at a first input and the gating signal ($GD_L$) 1004, 1104, 1204—used to drive the low-side switch ($Q_1$) 104, at a second input. In embodiments, the gating signal ($GD_L$) 1004, 1104, 1204 is at a logic level high when the low-side switch ($Q_1$) 104 is in the ON state and at a logic level low when the low-side switch ($Q_1$) 104 is in the OFF state. The first AND gate 818 implements a logical conjunction based on the input signals at its first and second inputs, which is fed to the "Reset" (R) input of the first flip-flop ($FF_1$) 820. This effectively allows the output of the first comparator ($COMP_1$) 812 to be strobed in the instant when the low-side switch ($Q_1$) 104 is turned ON.

The first flip-flop ($FF_1$) 820 generates an output signal at its output (Q) based on the inverted signal ($GD_{HN}$) at the "Set" (S) input and the logical conjunction of the first comparator ($COMP_1$) 812 and the gating signal ($GD_L$) 1004, 1104, 1204 at the Reset" (R) input. Thus, the first flip-flop ($FF_1$) 820 may reset when the low-side switch ($Q_1$) 104 is turned ON. The first flip-flop ($FF_1$) 820 is set when the high-side switch ($Q_2$) 208 is turned OFF.

The second inverter 816 is configured to receive the gating signal ($GD_L$) 1004, 1104 and generate an inverted signal ($GD_{LN}$). The second AND gate 822 has a first input coupled to the output (Q) of the first flip-flop ($FF_1$) 820. A second input of the second AND gate 822 is configured to receive the inverted signal ($GD_{LN}$) from the second inverter 816. The second AND gate 822 implements a logical conjunction based on the input signals at its first and second inputs, fed to the reverse timer circuit 824.

Operationally, at step 902, method 900 begins at the instant immediately before activating the low-side switch ($Q_1$) 104. At step 904, the filtered current sense voltage ($V_{CSF}$) 1008, 1108, 1208 is compared to a threshold ($V_{CS\_TH}$). In embodiments, the threshold ($V_{CS\_TH}$) is slightly negative (e.g., −20 or −30 mV). In embodiments, the filtered current sense voltage ($V_{CSF}$) 1008, 1108, 1208 is the filtered signal of the current sense voltage ($V_{CS}$) 1010 across the sense resistor ($R_S$) 802.

In embodiments, the first comparator ($COMP_1$) 812 provides an output signal to the first AND gate 818 based on the comparison of the filtered current sense voltage ($V_{CSF}$) 1008, 1108, 1208 and the threshold ($V_{CS\_TH}$). In response to the summed value being greater than the filtered current sense voltage ($V_{CSF}$) 1008, 1108, the first comparator ($COMP_1$) 812 will output a logic level high (e.g., '1'). In response to the summed value of threshold ($V_{CS\_TH}$) and the comparator output being less than the filtered current sense voltage ($V_{CSF}$) 1008, 1208, the first comparator ($COMP_1$) 812 will output a logic level low (e.g., '0').

In response to the filtered current sense voltage ($V_{CSF}$) 1008, 1108 being less negative than the threshold ($V_{CS\_TH}$), at step 906, a flag (Z Flag) 1012, 1112 is set to a logic level high (e.g., '1'). Setting the flag (Z Flag) 1012, 1112 to logic level high, indicates insufficient negative current. In response to the filtered current sense voltage ($V_{CSF}$) 1008, 1208 being more negative than the threshold ($V_{CS\_TH}$), at step 908, the flag (Z Flag) 1012, 1212 is set to a logic level low (e.g., 'o'). Setting the flag (Z Flag) 1012, 1212 to logic level low, indicates sufficient negative current. In embodiments, the output of the first flip-flop ($FF_1$) 820 corresponds to the value of the flag (Z Flag) 1012, 1112, 1212.

During the time that the low-side switch ($Q_1$) 104 is in the ON state, corresponding to the gating signal ($GD_L$) 1004, 1104 being at a logic level high, if the output of the first comparator ($COMP_1$) 812 is at a logic level high, indicating sufficient negative current, the inputs of the first AND gate 818 are at a logic level high. Accordingly, the output of the first AND gate 818 is at a logic level high, resulting in a reset signal being asserted at the "Reset" input of the first flip-flop ($FF_1$) 820. As the first flip-flop ($FF_1$) 820 is reset, the flag (Z Flag) 1012, 1112 is set to a logic level low.

In embodiments, the flag (Z flag) defaults to a logic level high when the high-side switch ($Q_2$) 208 is turned OFF. When the internal signal that commands the low-side switch ($Q_1$) 104 indicates the low-side switch ($Q_1$) 104 to turn ON (Q1 is turned on after some delay introduced by the internal circuits), if the output of the first comparator ($COMP_1$) 812 is high the first flip-flop ($FF_1$) 820 is reset, and the flag (Z flag) is set to the logic level low; otherwise, it stays at a logic level high. As the first flip-flop ($FF_1$) 820 is edge-sensitive, only the status of the first comparator ($COMP_1$) 812, in the instant when the gating signal ($GD_L$) transitions from the logic level low to the logic level high, is significant.

Accordingly, in embodiments, the default state of the flag (Z Flag) 1012, 1112, 1212 is set to a logic level high and in response to the comparison operation at step 904, the flag (Z Flag) 1012 may be set to a logic level low when the reset signal is asserted at the first flip-flop ($FF_1$) 820.

Generally, the amount of energy required to achieve ZVS, depends on various factors such as the parasitic capacitances of the low-side switch ($Q_1$) 104 and the transformer 108 or stray contributors such as metal objects (e.g., heat sink) in the vicinity of the low-side switch ($Q_1$) 104. To account for these various contributors, the adjustment circuit 806 can be optionally added to the timing circuit 800 to tune the amount of negative current. Further, the adjustment circuit 806 can be optionally added to the timing circuit 800 to account for variations in component tolerances.

In embodiments, the first current generator 830 is turned ON immediately before the low-side switch ($Q_1$) 104 is activated at step 910 for a short duration. At the end of the short duration, the first current generator 830 is turned OFF. The third flip-flop ($FF_3$) 828 is set in response to the high-side switch ($Q_2$) 208 being in the OFF state, corresponding to the gating signal ($GD_H$) 1002, 1102, 1202 being at a logic level low and the inverted signal ($GD_{HN}$) being at a logic level high. In embodiments, the third flip-flop ($FF_3$) 828 is an SR (Set-Reset) flip-flop.

Accordingly, when the high-side switch ($Q_2$) 208 is deactivated, the first current generator 830 is turned ON. The first current generator 830 is turned OFF in response to a leading-edge blanking (LEB) signal being asserted at the "Reset" (R) input of the third flip-flop ($FF_3$) 828. The LEB signal is typically used in a peak current mode controller setup to blank out the spike on the current sense signal when the power switch transitions between the OFF and ON states, to avoid premature turn-off and false triggering of protection mechanisms. The LEB signal is asserted low at the adjustment circuit 806 when the gating signal ($GD_L$) 1004 is set to high and asserted high for a short while after the low-side switch ($Q_1$) 104 is activated at step 910. In embodiments, this short time window equals 100 to 200 ns after the low-side switch ($Q_1$) 104 is activated.

The amount of current generated by the first current generator 830 can be fixed or proportional to the input voltage ($V_{IN}$) (i.e., $k \times V_{IN}$, where k is the proportionality factor). By injecting the current generated by the first current generator 830 at current sense (CS) node 805, the current sense voltage ($V_{CS}$) 1010, 1110, 1210 at the current sense (CS) node 805 is offset by a voltage equal to the current generated by the first current generator 830 multiplied by the resistance value of the fine-tuning element ($R_{FT}$) 804.

If the current generated by the first current generator 830 is equal to zero (e.g., the adjustment circuit 806 is excluded from the timing circuit 800), the filtered current sense voltage ($V_{CSF}$) 1008, 1108, 1208 at the filtered current sense ($V_{CSF}$) node 807 at the inverting input of the first comparator ($COMP_1$) 812 is approximately equal to the current sense voltage ($V_{CS}$) 1010, 1110, 1210 at the current sense (CS) node 805.

However, if the adjustment circuit 806 is included, the filtered current sense voltage ($V_{CSF}$) 1008, 1108, 1208 at the filtered current sense ($V_{CSF}$) node 807 at the inverting input of the first comparator ($COMP_1$) 812 is slightly more positive than the current sense voltage ($V_{CS}$) 1010, 1110, 1210. The offset would then require the filtered current sense voltage ($V_{CSF}$) 1008, 1108, 1208 to be more negative for the non-inverting input of the first comparator ($COMP_1$) 812 to go below the threshold ($V_{CS\_TH}$), which results in a longer duration of the time interval between time $t_3$ and time $t_4$. This effect can be adjusted by changing the resistance value of the fine-tuning element ($R_{FT}$) 804.

Thus, advantageously, the adjustment circuit 806 allows the timing circuit 800 to adjust the value of the reverse current ($I_{REV}$) 1018, 1118, 1218 to achieve ZVS or near ZVS. In embodiments, the fine-tuning element ($R_{FT}$) 804 is set to 100 ohms to have a low impedance which does not generate significant additional noise to the system.

Immediately after steps 906 and 908, at step 910, the low-side switch ($Q_1$) 104 is activated. At step 912, after the low-side switch ($Q_1$) 104 is in the ON state, an End-of-Count (EoC) counter value is decreased by one step. It is noted that the End-of-Count (EoC) counter value will not be decreased if its value is at zero. The primary side current ramps up starting from the moment the low-side switch ($Q_1$) 104 is activated. The reason the End-of-Count (EoC) counter value is decreased by one step at step 912 in each cycle is that the operating condition may change and step 912 allows for the dynamic adjustment regardless of whether the filtered current sense voltage ($V_{CSF}$) 1008, 1108, 1208 is greater or less than the threshold ($V_{CS\_TH}$).

At step 914, the control loop, which controls the output voltage ($V_{OUT}$), determines that the low-side switch ($Q_1$) 104 is to be deactivated when the primary side current reaches a peak value. Immediately after the low-side switch ($Q_1$) 104 is deactivated, at step 916, the status of the flag (Z Flag) 1012, 1112, 1212 is analyzed.

The flag (Z Flag) 1012, 1112, 1212 is provided as the output of the first flip-flop ($FF_1$) 820 to a first input of the second AND gate 822. The second input of the second AND gate 822 is at a logic level high because the low-side switch ($Q_1$) 104 is deactivated, corresponding to the gating signal ($GD_L$) 1004, 1104, 1204 being at a logic level low and the inverted signal ($GD_{LN}$) being at a logic level high.

The End-of-Count (EoC) counter is implemented in the timing circuit 800 through the reverse current timer programming circuit 823. The first mono-flop ($MF_1$) 836 is configured to switch from a stable state to an unstable state for a predetermined period in response to being triggered and then automatically returns to the stable state. In embodiments, the first mono-flop ($MF_1$) 836 is arranged as a positive edge-triggered mono-flop.

Accordingly, if the flag (Z Flag) 1012, 1112 is at a logic level high, the second AND gate 822 provides a positive edge signal to the input of the first mono-flop ($MF_1$) 836. The positive edge signal (signal transitioning from a logic level low to a logic level high) triggers the first mono-flop ($MF_1$) 836, resulting in the change of state of the first mono-flop ($MF_1$) 836 and the generating of a charge pulse (CHP) 1016, 1116, 1216 for a duration ($\Delta t$) at its output (Q), activating the second current generator 840.

The activating of the second current generator 840 results in the flow of electric charge flowing into the second capacitor ($C_2$) 842. The charge ($\Delta Q$) added to the second capacitor ($C_2$) 842 can be represented by the equation: $\Delta Q = I \times \Delta t$, where I is the constant current generated by the second current generator 840 and $\Delta t$ is the duration. In embodiments, the charge ($\Delta Q$) added to the second capacitor ($C_2$) 842 is 250 pico-coulombs (pC). In embodiments, the second capacitor ($C_2$) 842 is integrated within the timing circuit 800. In embodiments, the second capacitor ($C_2$) 842 is a few pico-farads (pF).

At step 918, in response to the flag (Z Flag) 1012 being at a logic level high, the End-of-Count (EoC) counter value is increased by k number of steps because of insufficient negative current, where k is an integer greater than one. In embodiments, k is equal to two. If required, step 918 counteracts the effect of step 912 based on the comparison between the filtered current sense voltage ($V_{CSF}$) 1008, 1108, 1208 and the threshold ($V_{CS\_TH}$) for the present cycle.

At step 920, in response to the flag (Z Flag) 1012 being at a logic level low, or after step 918, a first dead time is introduced where the low-side switch ($Q_1$) 104 and the high-side switch ($Q_2$) 208 are both deactivated for a set duration.

At step 922, at the end of the first dead time, the high-side switch ($Q_2$) 208 is activated. The high-side switch ($Q_2$) 208 is activated when the active clamp flyback converter 200 operates in complementary control method 300 in response to the end of the first dead time. The high-side switch ($Q_2$) 208 is activated when the active clamp flyback converter 200 operates in non-complementary control method 400 in response to detecting demagnetization. Demagnetization refers to a zeroing of the energy stored in the transformer 108, which corresponds to a zeroing of the current flowing through the primary and secondary windings of the transformer 108.

In embodiments, the second flip-flop ($FF_2$) 826 is set by asserting a set signal to the "SET" (S) input of the second flip-flop ($FF_2$) 826 in response to the end of the first dead time or detecting demagnetization based on the type of control method.

At step 924, once the End-of-Count (EoC) counter value has been set the reverse current timer programming circuit 823 sets the duration of the reverse current (IRV) for the current cycle.

Like the first mono-flop ($MF_1$) 836, the second mono-flop ($MF_2$) 838 switches from a stable state to an unstable state for a predetermined period in response to being triggered and then automatically returns to the stable state. In embodiments, the second mono-flop ($MF_2$) 838 is arranged as a positive edge-triggered mono-flop.

When the high-side switch ($Q_2$) 208 is deactivated, corresponding to the gating signal ($GD_H$) 1002, 1102, 1202 being at a logic level low and the inverted signal ($GD_{HN}$) being at a logic level high, a positive edge signal is provided to the input of the second mono-flop ($MF_2$) 838. The positive edge signal triggers the second mono-flop ($MF_2$) 838, resulting in the change of state of the second mono-flop ($MF_2$) 838 and the generating of a discharge pulse (DISCHP) 1014, 1114, 1214 for a duration ($\Delta t$) at its output (Q), which activates the third current generator 844. The third current generator 844 is a negative current generator. The activating of the third current generator 844 results in the discharging of the second capacitor ($C_2$) 842.

In embodiments, the increase in the voltage generated by the reverse current timer programming circuit 823 on second capacitor ($C_2$) 842 when the flag (Z Flag) 1012 is high and due to second current generator 840 is K times the decrease due to the activation of the third current generator 844 at every cycle. Therefore, either the duration of the pulses generated by the first mono-flop ($MF_1$) 836 and the second mono-flop ($MF_2$) 838 is the same and the second current generator 840 provides a current K times that of third current generator 844. Alternatively, the second current generator 840 and third current generator 844 are equal and the duration of the pulse of the first mono-flop ($MF_1$) 836 is K times longer than that of the second mono-flop ($MF_2$) 838. Regardless, the results are the same.

As the charging of the second capacitor ($C_2$) 842 at step 916 only occurs for cycles when the flag (Z Flag) 1012 is at a logic level high and the discharging of the second capacitor ($C_2$) 842 at step 926 occurs for each cycle, the timing circuit 800 determines a balance where a certain number of cycles, the flag (Z Flag) 1012 is at a logic level high and a certain number of cycles, the flag (Z Flag) 1012 is at a logic level low.

Accordingly, over multiple cycles, a DC voltage is generated across the second capacitor ($C_2$) 842 with a small ripple. The second capacitor ($C_2$) 842 is sized such that the ripple is negligible compared to the DC voltage. The DC voltage is provided as a reference voltage to the inverting input of the second comparator ($COMP_2$) 852.

The fixed current generator 846 and the third capacitor ($C_3$) 850 provide a ramping voltage to the non-inverting input of the second comparator ($COMP_2$) 852. When the ramping voltage provided to the non-inverting input of the second comparator ($COMP_2$) 852 reaches the DC voltage level, a reset signal is asserted at the "Reset" (R) input of the second flip-flop ($FF_2$) 826. Resetting the second flip-flop ($FF_2$) 826 results in the deactivating of the high-side switch ($Q_2$) 208 due to the output (Q) of the second flip-flop ($FF_2$) 826 providing the gating signal ($GD_H$) 1002, 1102, 1202, used to drive the high-side switch ($Q_2$) 208.

The control signal for the switch (SW) 848 is provided by the inverted output (Q) of the second flip-flop ($FF_2$) 826. When the gating signal ($GD_H$) 1002, 1102, 1202 is at the logic level low, the inverted output (Q) of the second flip-flop ($FF_2$) 826 is at a logic level high, which closes the switch (SW) 848, and resets the timing circuit 800.

Thus, at step 926, after the counter of the timing circuit 800 reaches the End-of-Count (EoC) counter value, the high-side switch ($Q_2$) 208 is deactivated. At step 928, a second dead time is introduced. At the end of the second dead time, method 900 returns to step 904, where the low-side switch ($Q_1$) 104 is to be turned ON, and the steps are repeated for the next cycle.

Thus, for continuous cycles, in response to insufficient negative current, the End-of-Count (EoC) counter value is increased and in response to sufficient negative current, the End-of-Count (EoC) counter value is decreased but at a rate that is slower than its increase. Effectively, this provides a "return spring" type of operation that enables the reverse current to be decreased if the operation conditions change such that less reverse current is required to achieve ZVS. Advantageously, this process allows the duration of the reverse current ($I_{REV}$) 1018, 1118, 1218 to be dialed in to achieve ZVS or near ZVS.

In the active clamp flyback converter 200, if the input voltage ($V_{IN}$) is smaller than the reflected voltage ($V_R$) (i.e., $V_{IN} \leq V_R$), ZVS is achieved naturally and without the need for a reverse current ($I_{REV}$) 1018, 1118, 1218.

Thus, optionally, if the programmed duration for the reverse current ($I_{REV}$) 1018, 1118, 1218 (i.e., the DC voltage provided as the reference voltage to the inverting input of the second comparator ($COMP_2$) 852) is lower than a minimum value, the high-side switch ($Q_2$) 208 is not activated during that switching cycle. Alternatively, if the flag (Z Flag) 1012 is at a logic level low (i.e., no charging of the second capacitor ($C_2$) 842 at step 916) for n consecutive switching cycles, the high-side switch ($Q_2$) 208 is disabled and only re-enabled when the flag (Z Flag) 1012 is detected to be at a logic level high (i.e., charging of the second capacitor ($C_2$) 842 at step 916) for that cycle.

Figure 8A:
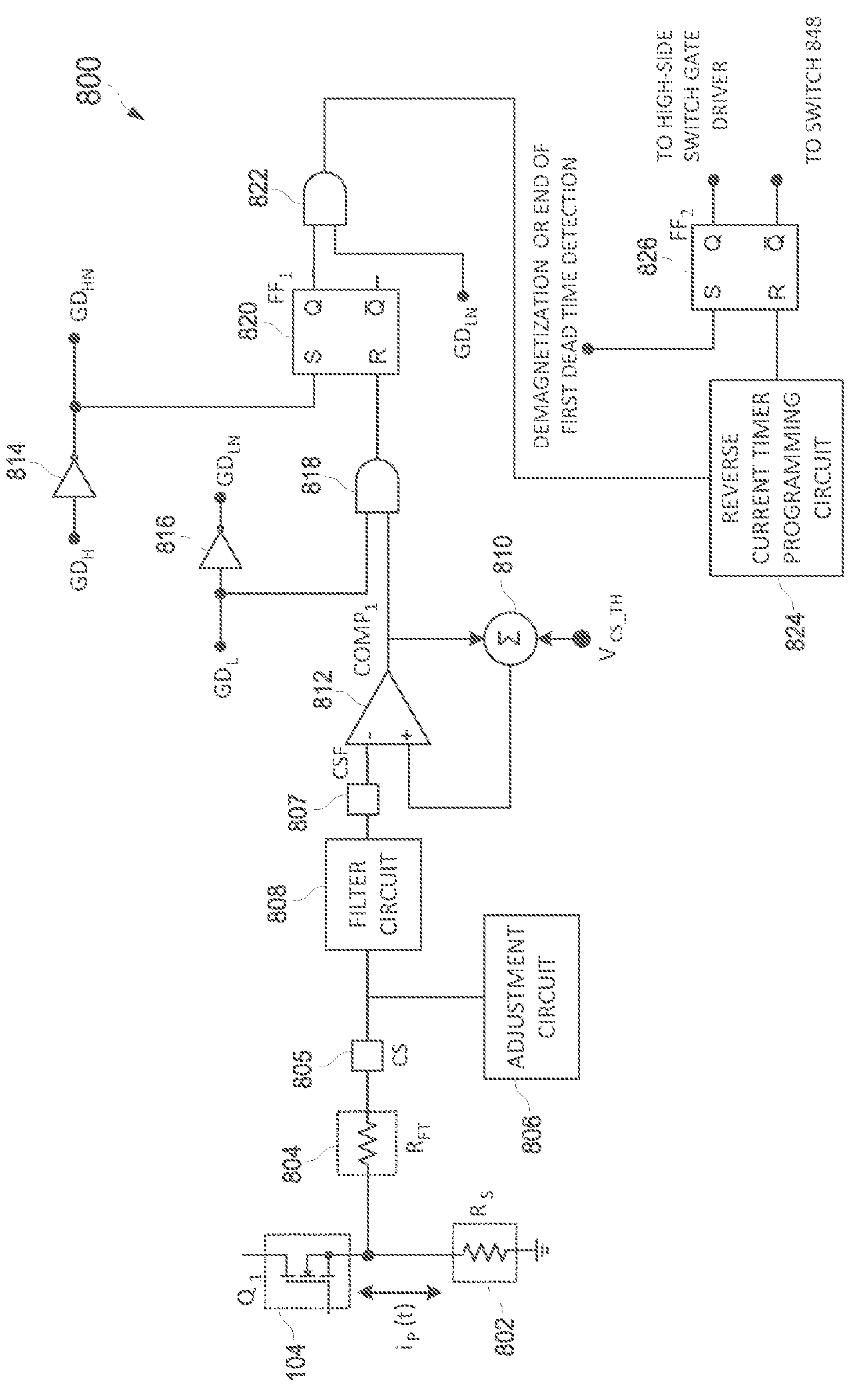
FIGS. 8A-D respectively illustrate a schematic of an embodiment timing circuit, an adjustment circuit, a filter circuit, and a reverse timer circuit.
Figures 8B, 8C, 13, 14:
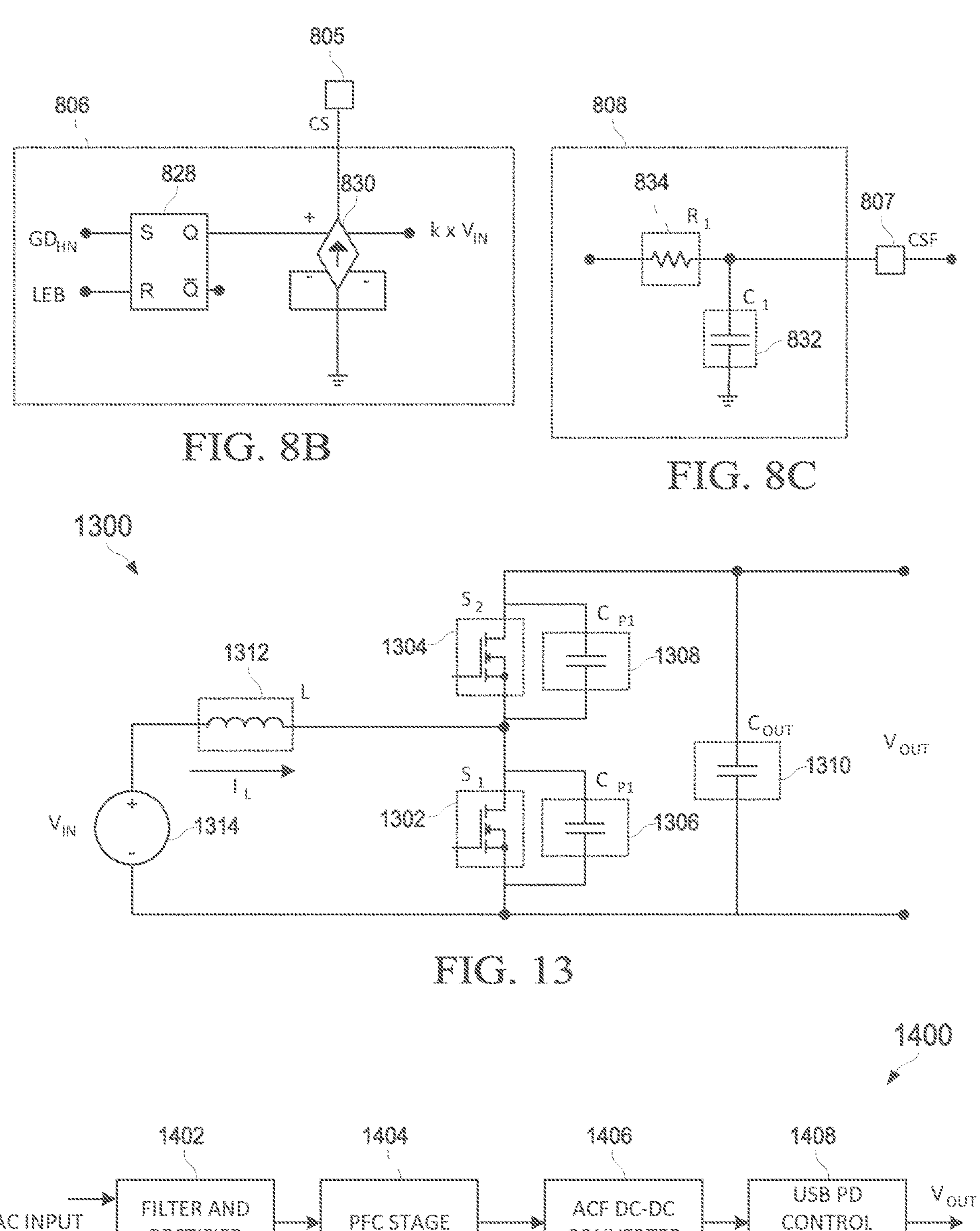
FIG. 13 is a block diagram of an embodiment power converter with a totem-pole power factor correction (PFC) topology.
FIG. 14 is a block diagram of an embodiment system.
Figure 8D:
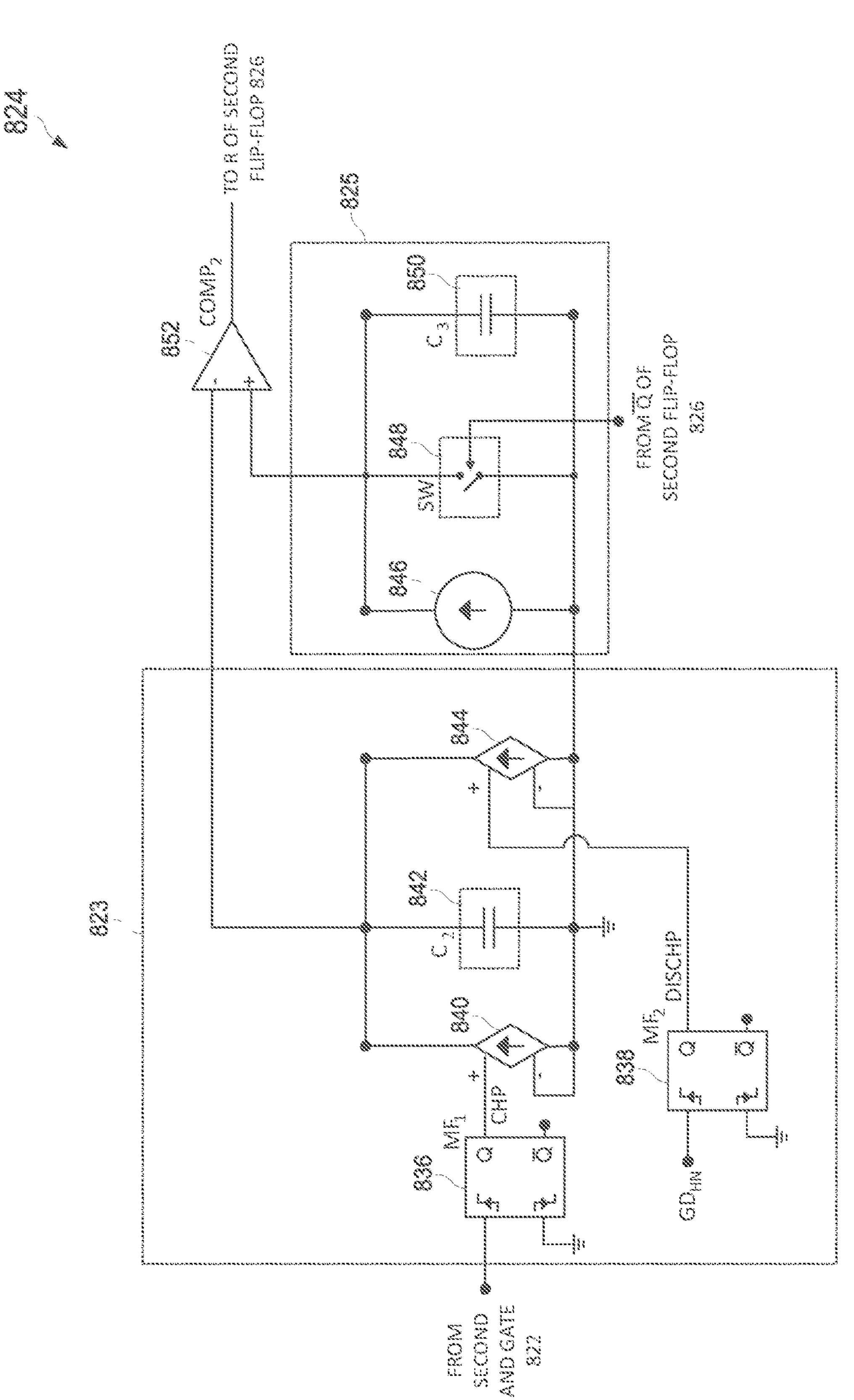
Figure 9:
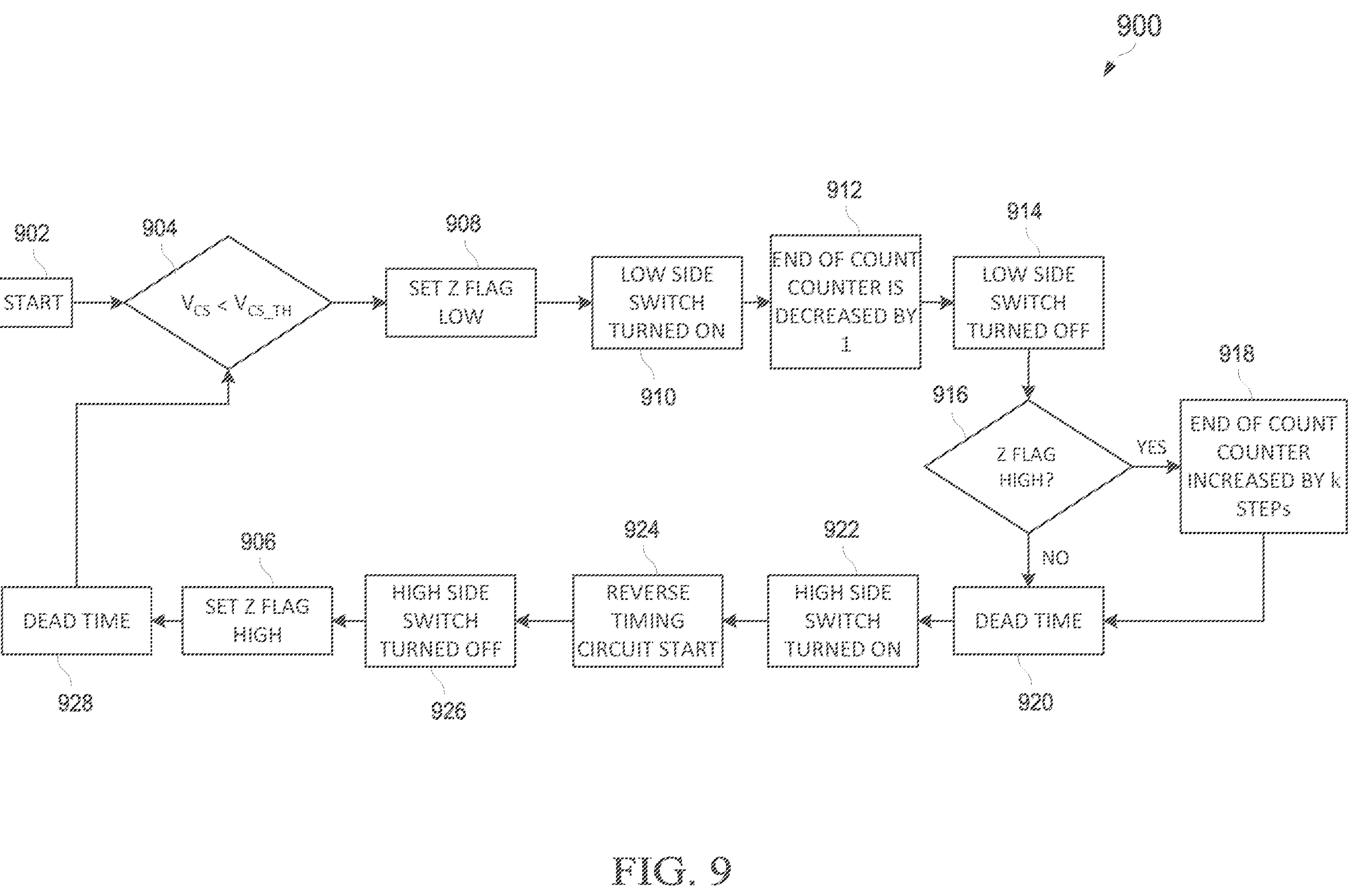
FIG. 9 is a flow chart of an embodiment method for self-adjusting the reverse current ($I_{REV}$) using the timing circuit during the OFF state of the low-side switch.

FIG. 13 illustrates a block diagram of an embodiment power converter 1300 with a totem-pole power factor correction (PFC) topology. Power converter 1300 includes a first semiconductor switch ($S_1$) 1302, a second semiconductor switch ($S_2$) 1304, a first capacitor ($C_{P1}$) 1306, a second capacitor ($C_{P2}$) 1308, an output capacitor ($C_o$) 1310, an inductor (L) 1312, and a voltage source 1314, which may (or may not) be arranged as shown. Power converter 1300 may include additional components not shown, such as a load at the output of the power converter 1300 arranged in parallel with the output capacitor ($C_o$) 1310.

In embodiments, each of the first semiconductor switch ($S_1$) 1302 and the second semiconductor switch ($S_2$) 1304 is a MOSFET or a GaN type FET. The first semiconductor switch ($S_1$) 1302 and the second semiconductor switch ($S_2$) 1304 are arranged in a totem-pole topology (i.e., stacked vertically).

In Triangular Current Mode (TCM), also known as boundary conduction mode (BCM) or critical conduction mode (CrCM), the power switch operates right at the boundary between continuous conduction mode (CCM) and discontinuous conduction mode (DCM). In TCM, the inductor (L) 1312 current ramps up from zero and goes back to zero in each switching cycle. TCM control ensures that the power converter 1300 always switches when the inductor (L) 1312 current reaches zero, reducing switching losses.

The timing circuit 800 and method 900 can similarly apply to the operation of the first semiconductor switch ($S_1$) 1302 and the second semiconductor switch ($S_2$) 1304, where the first semiconductor switch ($S_1$) 1302 and the second semiconductor switch ($S_2$) 1304 are, respectively operated similar to low-side switch ($Q_1$) 104 and the high-side switch ($Q_2$) 208.

The timing circuit 800 and method 900 are implemented in the operation of the power converter 1300 such that the current (IL) in the inductor (L) 1312 is sufficiently negative to achieve soft-switching for the first semiconductor switch ($S_1$) 1302 and the second semiconductor switch ($S_2$) 1304. Adjusting the negative current of the inductor (L) 1312 can be automated using the timing circuit 800 and method 900.

FIG. 14 illustrates a block diagram of an embodiment system 1400. In embodiments, system 1400 includes a filter and rectifier circuit 1402, an optional Power Factor Correction (PFC) stage circuit 1404, an active clamp flyback DC-DC converter 1406, and a USB PD Control stage circuit 1408, which may (or may not) be arranged as shown. System 1400 may include additional components not shown. In embodiments, system 1400 is a high-density USB-C charger used to charge, for example, a mobile device or the like.

The filter and rectifier circuit 1402 is configured to receive the alternating current (AC) input from a power source. The filter and rectifier circuit 1402 filters out noise and unwanted frequencies from the AC input and converts it into direct current (DC).

The PFC stage circuit 1404 ensures that the voltage and current waveforms are both sinusoidal and in-phase to maximize the power transfer efficiency. The PFC stage circuit 1404 is generally required for input power levels greater than 75 watts (W).

The active clamp flyback DC-DC converter 1406 converts the DC output from the PFC stage circuit 1404 to another DC level suitable for the USB PD Control stage circuit 1408. In embodiments, the active clamp flyback DC-DC converter 1406 is implemented as the active clamp flyback converter 200 with the timing circuit 800 and operated in accordance with method 900 to achieve ZVS or near ZVS.

The USB PD Control stage circuit 1408 regulates and controls the power via the output voltage ($V_{OUT}$) delivered to a USB-C device.

A first aspect relates to a method. The method includes sensing a reverse current through a main switch of an active clamp flyback (ACF) converter. The ACF converter includes a flyback transformer and an auxiliary switch. The method further includes determining whether a sense voltage corresponding to the reverse current exceeds a threshold; decreasing a duration for the reverse current by an incremental time interval, the duration of the reverse current including a first incremental time interval, the duration of the reverse current corresponding to a duration that the auxiliary switch is activated; increasing the duration by a second incremental time interval greater than the first incremental time interval, the increasing being in response to the reverse current not exceeding the threshold; and activating the auxiliary switch for the duration to achieve zero voltage switching (ZVS).

In a first implementation form of the method according to the first aspect, the determining of whether the sense voltage exceeds the threshold is completed before activating the main switch for the same cycle that the duration for the auxiliary switch is set.

In a second implementation form of the method according to the first aspect as such or any preceding implementation form of the first aspect, the method further includes delaying a first dead time after deactivating the main switch, wherein activating the auxiliary switch occurs after delaying the first dead time.

In a third implementation form of the method according to the first aspect as such or any preceding implementation form of the first aspect, the method further includes delaying a second dead time after deactivating the auxiliary switch. The activating of the main switch for the next cycle occurs after delaying the second dead time.

In a fourth implementation form of the method according to the first aspect as such or any preceding implementation form of the first aspect, the activating the auxiliary switch for the duration to achieve ZVS includes starting, after activating the auxiliary switch, a reverse current timer; and deactivating the auxiliary switch upon the reverse current timer reaching an end of count.

In a fifth implementation form of the method according to the first aspect as such or any preceding implementation form of the first aspect, the sensing of the reverse current through the main switch comprises sensing a voltage across a sense resistor coupled in series with the main switch.

In a sixth implementation form of the method according to the first aspect as such or any preceding implementation form of the first aspect, the threshold is a negative sense voltage threshold.

A second aspect relates to an active clamp flyback (ACF) converter. The ACF converter including a flyback transformer including a primary winding and a secondary winding; a main switch coupled in series with the primary winding between a DC voltage node and a reference voltage node; a clamping circuit coupled across the primary winding, the clamp circuit including a capacitor and an auxiliary switch; and a controller configured to control activation and deactivation of the main switch and the auxiliary switch and to sense a reverse current through the main switch. The controller is configured to sense a reverse current through the main switch through a current sense node, determine whether a sense voltage corresponding to the reverse current exceeds a threshold, decrease a duration for the reverse current by an incremental time interval, the duration of the reverse current including a first incremental time interval, the duration of the reverse current corresponding to a duration that the auxiliary switch is activated, increase the duration by a second incremental time interval greater than the first incremental time internal, the increasing being in response to the reverse current not exceeding the threshold, and activate the auxiliary switch for the duration to achieve zero voltage switching (ZVS).

In a first implementation form of the ACF converter according to the second aspect, the ACF further includes a sense resistor coupled between the reference voltage node and a current sense node coupled to a source of a field effect transistor (FET) forming the main switch.

In a second implementation form of the ACF converter according to the second aspect as such or any preceding implementation form of the second aspect, the controller includes a comparison circuit having a first input coupled to the current sense node and a second input coupled to receive the threshold. The comparison circuit is configured to generate a reverse current sense signal indicating whether the reverse current through the main switch exceeds the threshold.

In a third implementation form of the ACF converter according to the second aspect as such or any preceding implementation form of the second aspect, the controller further includes a reverse current timer programming circuit. The reverse current timer programming circuit includes a discharge current source coupled to discharge a voltage node to reduce the voltage of a reverse current time signal generated on the voltage node, the discharge current source is configured to discharge the voltage node each switching cycle of the ACF converter responsive to a gate drive signal applied to control deactivation of the auxiliary switch; and a charge current source coupled to charge the voltage node and increase the voltage of the reverse current time signal on the voltage node each switching cycle of the ACF converter in response to the reverse current sense signal indicating that the reverse current through the main switch does not exceed the threshold.

In a fourth implementation form of the ACF converter according to the second aspect as such or any preceding implementation form of the second aspect, the controller further includes a reverse current timer circuit coupled to the voltage node of the reverse current timer programming circuit. The reverse current timer circuit is configured to generate a gate drive signal to deactivate the auxiliary switch responsive to a ramp voltage signal on a ramp voltage node reaching the voltage of the reverse current time signal.

In a fifth implementation form of the ACF converter according to the second aspect as such or any preceding implementation form of the second aspect, the ACF further includes an adjustment circuit comprising a resistive element coupled between the current sense node and the first input of the comparison circuit; and a current source coupled to the first input of the comparison circuit, the current source configured, in response to a gate drive signal applied to deactivate the auxiliary switch, to supply charge to the first input of the comparison circuit to adjust a value of a voltage on the first input, and further configured to stop supplying charge to the first input responsive to a leading edge blanking signal.

In a sixth implementation form of the ACF converter according to the second aspect as such or any preceding implementation form of the second aspect, the threshold is a negative sense voltage threshold.

A third aspect relates to a system. The system including a load; a switching circuitry coupled to the load, the switching circuitry including an auxiliary switch and a main switch coupled in series between a supply voltage node and a reference voltage node; and a controller configured to control activation and deactivation of the main switch and the auxiliary switch and to sense a reverse current through the main switch. The controller configured to sense a reverse current through the main switch through a current sense node, determine whether a sense voltage corresponding to the reverse current exceeds a threshold, decrease a duration for the reverse current by an incremental time interval, the duration of the reverse current including a first incremental time interval, the duration of the reverse current corresponding to a duration that the auxiliary switch is activated, increase the duration by a second incremental time interval greater than the first incremental time interval, the increasing being in response to the reverse current not exceeding the threshold, and activate the auxiliary switch for the duration to achieve zero voltage switching (ZVS).

In a first implementation form of the system according to the third aspect, the switching circuitry includes a triangular current mode (TCM) power factor correction (PCF) circuitry.

In a second implementation form of the system according to the third aspect as such or any preceding implementation form of the third aspect, the switching circuitry includes an active clamp flyback converter switching circuitry. The auxiliary switch corresponds to a clamp switch of an active clamp circuit of the active clamp flyback converter switching circuitry.

In a third implementation form of the system according to the third aspect as such or any preceding implementation form of the third aspect, the controller includes a comparison circuit having a first input coupled to the current sense node and a second input coupled to receive the threshold. The comparison circuit is configured to generate a reverse current sense signal indicating whether the reverse current through the main switch exceeds the threshold.

In a fourth implementation form of the system according to the third aspect as such or any preceding implementation form of the third aspect, the controller further includes a reverse current timer programming circuit. The reverse current timer programming circuit includes a discharge current source coupled to discharge a voltage node to reduce a voltage of a reverse current time signal generated on the voltage node, the discharge current source configured to discharge the voltage node each switching cycle of the switching circuitry responsive to a gate drive signal applied to control deactivation of the auxiliary switch; and a charge current source coupled to charge the voltage node and increase the voltage of the reverse current time signal on the voltage node each switching cycle of the switching circuitry in response to the reverse current sense signal indicating that the reverse current through the main switch does not exceed the threshold.

In a fifth implementation form of the system according to the third aspect as such or any preceding implementation form of the third aspect, the controller further includes a reverse current timer circuit coupled to the voltage node of the reverse current timer programming circuit. The reverse current timer circuit is configured to generate a gate drive signal to deactivate the auxiliary switch responsive to a ramp voltage signal on a ramp voltage node reaching the voltage of the reverse current time signal.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:

sensing a reverse current through a main switch of an active clamp flyback (ACF) converter, the ACF converter comprising a flyback transformer and an auxiliary switch;

determining whether a sense voltage corresponding to the reverse current exceeds a threshold;

decreasing a duration for the reverse current by a first incremental time interval, the duration of the reverse current corresponding to a duration that the auxiliary switch is activated;

increasing the duration by a second incremental time interval greater than the first incremental time interval in response to the determining indicating that the sense voltage does not exceed the threshold; and activating the auxiliary switch for the duration to achieve zero voltage switching (ZVS).

2. The method of claim 1, wherein determining whether the sense voltage exceeds the threshold is completed before activating the main switch for the same cycle that the duration for the auxiliary switch is set.

3. The method of claim 1, further comprising delaying a first dead time after deactivating the main switch, wherein activating the auxiliary switch occurs after delaying the first dead time.

4. The method of claim 1, further comprising delaying a second dead time after deactivating the auxiliary switch, wherein activating the main switch for a next cycle occurs after delaying the second dead time.

5. The method of claim 1, wherein to activate the auxiliary switch for the duration to achieve ZVS comprises:

starting, after activating the auxiliary switch, a reverse current timer; and deactivating the auxiliary switch upon the reverse current timer reaching an end of count.

6. The method of claim 1, wherein sensing the reverse current through the main switch comprises sensing a voltage across a sense resistor coupled in series with the main switch.

7. The method of claim 1, wherein the threshold is a negative sense voltage threshold.

8. An active clamp flyback (ACF) converter, comprising:

a flyback transformer including a primary winding and a secondary winding;

a main switch coupled in series with the primary winding between a DC voltage node and a reference voltage node;

a clamping circuit coupled across the primary winding, the clamp circuit including a capacitor and an auxiliary switch; and a controller configured to control activation and deactivation of the main switch and the auxiliary switch and to sense a reverse current through the main switch, the controller configured to:

sense a reverse current through the main switch through a current sense node, determine whether a sense voltage corresponding to the reverse current exceeds a threshold, decrease a duration for the reverse current by a first incremental time interval the duration of the reverse current corresponding to a duration that the auxiliary switch is activated, increase the duration by a second incremental time interval greater than the first incremental time internal in response to the determining indicating that the sense voltage does not exceed the threshold, and activate the auxiliary switch for the duration to achieve zero voltage switching (ZVS).

9. The ACF converter of claim 8, further comprising a sense resistor coupled between the reference voltage node and the current sense node coupled to a source of a field effect transistor (FET) forming the main switch.

10. The ACF converter of claim 8, wherein the controller comprises a comparison circuit having a first input coupled to the current sense node and a second input coupled to receive the threshold, the comparison circuit configured to generate a reverse current sense signal indicating whether the reverse current through the main switch exceeds the threshold.

11. The ACF converter of claim 10, wherein the controller further comprises a reverse current timer programming circuit, the reverse current timer programming circuit including:

a discharge current source coupled to discharge a voltage node to reduce a voltage of a reverse current time signal generated on the voltage node, the discharge current source configured to discharge the voltage node each switching cycle of the ACF converter responsive to a gate drive signal applied to control deactivation of the auxiliary switch; and a charge current source coupled to charge the voltage node and increase the voltage of the reverse current time signal on the voltage node each switching cycle of the ACF converter in response to the reverse current sense signal indicating that the reverse current through the main switch does not exceed the threshold.

12. The ACF converter of claim 11, wherein the controller further comprises a reverse current timer circuit coupled to the voltage node of the reverse current timer programming circuit, the reverse current timer circuit configured to generate a gate drive signal to deactivate the auxiliary switch responsive to a ramp voltage signal on a ramp voltage node reaching the voltage of the reverse current time signal.

13. The ACF converter of claim 10, further comprising an adjustment circuit comprising:

a resistive element coupled between the current sense node and the first input of the comparison circuit; and a current source coupled to the first input of the comparison circuit, the current source configured, in response to a gate drive signal applied to deactivate the auxiliary switch, to supply charge to the first input of the comparison circuit to adjust a value of a voltage on the first input, and further configured to stop supplying charge to the first input responsive to a leading edge blanking signal.

14. The ACF converter of claim 8, wherein the threshold is a negative sense voltage threshold.

15. A system, comprising:

a load;

a switching circuitry coupled to the load, the switching circuitry including an auxiliary switch and a main switch coupled in series between a supply voltage node and a reference voltage node; and a controller configured to control activation and deactivation of the main switch and the auxiliary switch and to sense a reverse current through the main switch, the controller configured to:

sense a reverse current through the main switch through a current sense node, determine whether a sense voltage corresponding to the reverse current exceeds a threshold, decrease a duration for the reverse current by a first incremental time interval, the duration of the reverse current corresponding to a duration that the auxiliary switch is activated, increase the duration by a second incremental time interval greater than the first incremental time interval in response to the determining indicating that the sense voltage does not exceed the threshold, and activate the auxiliary switch for the duration to achieve zero voltage switching (ZVS).

16. The system of claim 15, wherein the switching circuitry comprises a triangular current mode (TCM) power factor correction (PCF) circuitry.

17. The system of claim 15, wherein the switching circuitry comprises an active clamp flyback converter switching circuitry, wherein the auxiliary switch corresponds to a clamp switch of an active clamp circuit of the active clamp flyback converter switching circuitry.

18. The system of claim 15, wherein the controller comprises a comparison circuit having a first input coupled to the current sense node and a second input coupled to receive the threshold, the comparison circuit configured to generate a reverse current sense signal indicating whether the reverse current through the main switch exceeds the threshold.

19. The system of claim 15, wherein the controller further comprises a reverse current timer programming circuit, the reverse current timer programming circuit including:

a discharge current source coupled to discharge a voltage node to reduce a voltage of a reverse current time signal generated on the voltage node, the discharge current source configured to discharge the voltage node each switching cycle of the switching circuitry responsive to a gate drive signal applied to control deactivation of the auxiliary switch; and a charge current source coupled to charge the voltage node and increase the voltage of the reverse current time signal on the voltage node each switching cycle of the switching circuitry in response to the reverse current sense signal indicating that the reverse current through the main switch does not exceed the threshold.

20. The system of claim 19, wherein the controller further comprises a reverse current timer circuit coupled to the voltage node of the reverse current timer programming circuit, the reverse current timer circuit configured to generate a gate drive signal to deactivate the auxiliary switch responsive to a ramp voltage signal on a ramp voltage node reaching the voltage of the reverse current time signal.

* * * * *